(12) United States Patent
Wexler et al.

(10) Patent No.: US 10,341,544 B2
(45) Date of Patent: Jul. 2, 2019

(54) DETERMINING A MATCHING SCORE BETWEEN USERS OF WEARABLE CAMERA SYSTEMS

(71) Applicant: OrCam Technologies Ltd., Jerusalem (IL)

(72) Inventors: Yonatan Wexler, Jerusalem (IL); Amnon Shashua, Mevaseret Zion (IL)

(73) Assignee: OrCam Technologies Ltd., Jerusalem (IL)

( * ) Notice: Subject to any disclaimer, the term of this patent is extended or adjusted under 35 U.S.C. 154(b) by 383 days.

(21) Appl. No.: 14/807,073

(22) Filed: Jul. 23, 2015

(65) Prior Publication Data

US 2016/0026238 A1 Jan. 28, 2016

Related U.S. Application Data

(60) Provisional application No. 62/027,957, filed on Jul. 23, 2014, provisional application No. 62/027,936, filed on Jul. 23, 2014.

(51) Int. Cl.
*H04N 5/225* (2006.01)
*G06F 1/18* (2006.01)
(Continued)

(52) U.S. Cl.
CPC ......... *H04N 5/2259* (2013.01); *G01S 3/7864* (2013.01); *G02B 27/0093* (2013.01);
(Continued)

(58) Field of Classification Search
CPC ... G06T 7/74; G06T 7/97; G06T 2207/30232; G06T 7/20; G06T 2207/10004; G06T 2207/10016; G06F 1/188; G06F 2203/011; G06F 3/0304; G06F 1/1686; G06F 17/30277; G06F 3/012; G06F 3/017;
(Continued)

(56) References Cited

U.S. PATENT DOCUMENTS

2009/0051785 A1* 2/2009 Kamada ................. H04N 7/183
348/231.5
2009/0319436 A1* 12/2009 Andra ................. G06F 17/2785
705/80

(Continued)

*Primary Examiner* — Sathyanaraya V Perungavoor
*Assistant Examiner* — Philip P. Dang
(74) *Attorney, Agent, or Firm* — Finnegan, Henderson, Farabow, Garrett & Dunner LLP

(57) ABSTRACT

A server and method are provided for determining a matching score related to users of wearable camera systems. In one implementation, a server determines a matching score related to users of wearable camera systems. Each wearable camera system is configured to capture images from an environment of a corresponding user and produce image data from the captured images. At least one processing device associated with the server may be programmed to receive image data from the wearable camera systems. The processing device may further determine a value of a matching score related to at least two users of the wearable camera systems. The value of the matching score may be based on the image data received from the wearable camera systems. The value of the matching score may indicate a level of exposure of the two users to similar visual details in their environments.

17 Claims, 20 Drawing Sheets

(51) Int. Cl.
  G06F 16/532 (2019.01)
  G02B 27/00 (2006.01)
  G02B 27/01 (2006.01)
  G06F 3/01 (2006.01)
  G06Q 30/02 (2012.01)
  H04N 5/232 (2006.01)
  H04N 7/18 (2006.01)
  G06F 1/16 (2006.01)
  G06F 3/00 (2006.01)
  G06F 3/038 (2013.01)
  H04N 5/235 (2006.01)
  G06K 9/00 (2006.01)
  G06T 7/20 (2017.01)
  H04N 5/44 (2011.01)
  G01S 3/786 (2006.01)
  H04N 1/21 (2006.01)
  G06K 9/62 (2006.01)
  G06F 3/03 (2006.01)
  G06T 7/00 (2017.01)
  G06T 7/73 (2017.01)
  G06F 16/53 (2019.01)
  G06F 16/51 (2019.01)

(52) U.S. Cl.
  CPC ........... *G02B 27/017* (2013.01); *G06F 1/163* (2013.01); *G06F 1/1686* (2013.01); *G06F 1/18* (2013.01); *G06F 1/188* (2013.01); *G06F 3/005* (2013.01); *G06F 3/011* (2013.01); *G06F 3/012* (2013.01); *G06F 3/017* (2013.01); *G06F 3/0304* (2013.01); *G06F 3/038* (2013.01); *G06F 16/51* (2019.01); *G06F 16/53* (2019.01); *G06F 16/532* (2019.01); *G06K 9/00201* (2013.01); *G06K 9/00208* (2013.01); *G06K 9/00221* (2013.01); *G06K 9/00288* (2013.01); *G06K 9/00335* (2013.01); *G06K 9/00624* (2013.01); *G06K 9/00671* (2013.01); *G06K 9/00677* (2013.01); *G06K 9/00718* (2013.01); *G06K 9/6262* (2013.01); *G06Q 30/0246* (2013.01); *G06Q 30/0257* (2013.01); *G06Q 30/0267* (2013.01); *G06Q 30/0269* (2013.01); *G06T 7/20* (2013.01); *G06T 7/74* (2017.01); *G06T 7/97* (2017.01); *H04N 1/2112* (2013.01); *H04N 5/2251* (2013.01); *H04N 5/2252* (2013.01); *H04N 5/2254* (2013.01); *H04N 5/2257* (2013.01); *H04N 5/2258* (2013.01); *H04N 5/2353* (2013.01); *H04N 5/23206* (2013.01); *H04N 5/23216* (2013.01); *H04N 5/23219* (2013.01); *H04N 5/23229* (2013.01); *H04N 5/23245* (2013.01); *H04N 5/23258* (2013.01); *H04N 5/44* (2013.01); *H04N 7/183* (2013.01); *H04N 7/185* (2013.01); *G02B 2027/014* (2013.01); *G02B 2027/0138* (2013.01); *G02B 2027/0178* (2013.01); *G02B 2027/0187* (2013.01); *G06F 2203/011* (2013.01); *G06K 2209/21* (2013.01); *G06K 2209/25* (2013.01); *G06T 2207/10004* (2013.01); *G06T 2207/10016* (2013.01); *G06T 2207/30232* (2013.01)

(58) Field of Classification Search
  CPC . G06F 3/011; G06F 1/18; G06F 3/038; G06F 3/005; G06F 1/163; G02B 2027/014; G02B 2027/0138; G02B 2027/0178; G02B 2027/0187; G02B 27/017; G02B 27/0093; G06K 2209/25; G06K 2209/21; G06K 9/00208; G06K 9/00624; G06K 9/00201; G06K 9/00677; G06K 9/00288; G06K 9/6262; G06K 9/00335; G06K 9/00221; G06K 9/00671; G06K 9/00718; G06Q 30/0257; G06Q 30/0246; G06Q 30/0267; G06Q 30/0269; G01S 3/7864; H04N 5/23258; H04N 5/23206; H04N 5/23245; H04N 1/2112; H04N 5/23229; H04N 5/2353; H04N 5/23219; H04N 5/44; H04N 5/2259; H04N 5/2254; H04N 5/2257; H04N 5/2251; H04N 5/2258; H04N 7/185; H04N 5/23216; H04N 5/2252; H04N 7/183
  See application file for complete search history.

(56) References Cited

U.S. PATENT DOCUMENTS

| | | | |
|---|---|---|---|
| 2010/0226535 A1* | 9/2010 | Kimchi | G06F 3/013 382/103 |
| 2010/0333020 A1* | 12/2010 | Jeong | G06Q 10/109 715/810 |
| 2012/0076367 A1* | 3/2012 | Tseng | G06K 9/00288 382/118 |
| 2014/0286566 A1* | 9/2014 | Rhoads | G06T 3/4038 382/154 |

* cited by examiner

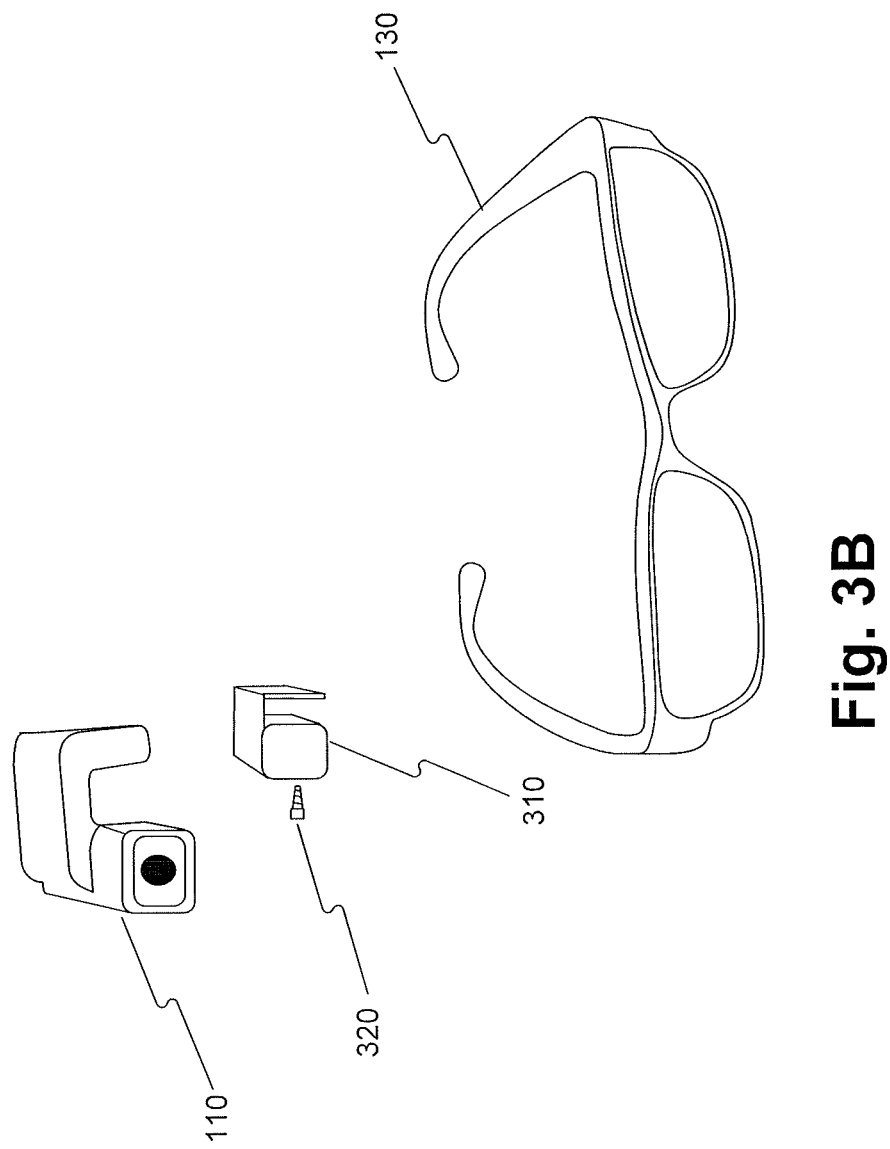

1200

| | Gender (M/F) 1210 | Age 1211 | Weight 1212 | Height 1213 | Hair color 1214 | Eye color 1215 | ... | Postal code 1222 |
|---|---|---|---|---|---|---|---|---|
| User 100 | M | 31 | 160 | 6.1 | Black | Black | | 10000 |
| User 701 | M | 33 | 180 | 6.3 | Brown | Brown | | 10060 |
| User 702 | F | 28 | 110 | 5.7 | Blond | Blue | | 10001 |
| ... | ... | ... | ... | ... | | | ⋮ | |
| User 703 | F | 27 | 110 | 5.8 | Red | Blue | | 10400 |

| Image Identifier 1110 | Wearable Apparatus Identifier 1111 | Identified content 1112 | Location 1113 | Date 1114 | Time 1115 | User 1105 |
|---|---|---|---|---|---|---|
| 1001 | | ABC Soccer League | 15 K Street, Washington, DC | 6/7/2015 | 3:00 p.m. | 100 |
| 1002 | W729E02P | Z Soccer | 15 K Street, Washington, DC | 6/7/2015 | 3:01 p.m. | 100 |
| 1003 | | X Soccer | 15 K Street, Washington, DC | 6/7/2015 | 3:02 p.m. | 100 |
| . . . | . . . | . . . | . . . | . . . | . . . | |
| 1050 | W739C08 | ABC Soccer League | GPS 38.9047° N, 77.0164° W | 6/7/2015 | 3:04 p.m. | 106 |

DETERMINING A MATCHING SCORE BETWEEN USERS OF WEARABLE CAMERA SYSTEMS

CROSS REFERENCES TO RELATED APPLICATIONS

This application claims the benefit of priority of U.S. Provisional Patent Application No. 62/027,936, filed on Jul. 23, 2014, and U.S. Provisional Patent Application No. 62/027,957, filed on Jul. 23, 2014, all of which are incorporated herein by reference in their entirety.

BACKGROUND

I. Technical Field

This disclosure generally relates to devices and methods for capturing and processing images from an environment of a user. More particularly, this disclosure relates to determining a matching score related to users of wearable camera systems.

II. Background Information

Today, technological advancements make it possible for wearable devices to automatically capture images and store information that is associated with the captured images. Certain devices have been used to digitally record aspects and personal experiences of one's life in an exercise typically called "lifelogging." Some individuals log their life so they can retrieve moments from past activities, for example, social events, trips, etc. Lifelogging may also have significant benefits in other fields (e.g., business, fitness and healthcare, and social research). Lifelogging devices, while useful for tracking daily activities, may be improved with capability to enhance one's interaction in his environment with feedback and other advanced functionality based on the analysis of captured image data.

Even though users can capture images with their smartphones and some smartphone applications can process the captured images, smartphones may not be the best platform for serving as lifelogging apparatuses in view of their size and design. Lifelogging apparatuses should be small and light, so they can be easily worn. Moreover, with improvements in image capture devices, including wearable apparatuses or wearable camera systems, additional functionality may be provided to assist users in navigating in and around an environment. Therefore, there is a need for apparatuses and methods for automatically capturing and processing images in a manner that provides useful information to users of the apparatuses.

SUMMARY

Embodiments consistent with the present disclosure provide an apparatus and methods for automatically capturing and processing images from an environment of a user.

In accordance with a disclosed embodiment, a server is provided to determine a matching score related to users of wearable camera systems. The server includes a memory and at least one processing device associated with the server. The memory stores image data captured by the wearable camera systems. Each wearable camera system is configured to capture images from an environment of a corresponding user. The at least one processing device associated with the server is programmed to receive the image data from the wearable camera systems and determine a value of the matching score related to at least two users of the wearable camera systems. The value of the matching score is based on the image data captured by the wearable camera systems of the at least two users and indicates a level of exposure of the two users to similar visual details in their environments.

Consistent with another disclosed embodiment, a method is provided to determine a matching score related to users of wearable camera systems. The method includes receiving, by at least one processing device, image data captured by the wearable camera systems. Each wearable camera system is configured to capture images from an environment of a corresponding user. The method further includes determining, by the at least one processing device, a value of the matching score related to at least two users of the wearable camera systems. The value of the matching score is based on the image data captured by the wearable camera systems of the two users and indicates a level of exposure of the two users to similar visual details in their environments.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 3B is an exploded view of the example of the wearable camera system shown in FIG. 3A.

FIG. 8 is an example database table for storing information associated with at least one user of a wearable camera system.

FIG. 10 is an example database table for storing information associated with at least one captured image.

DETAILED DESCRIPTION

Figure 1A:
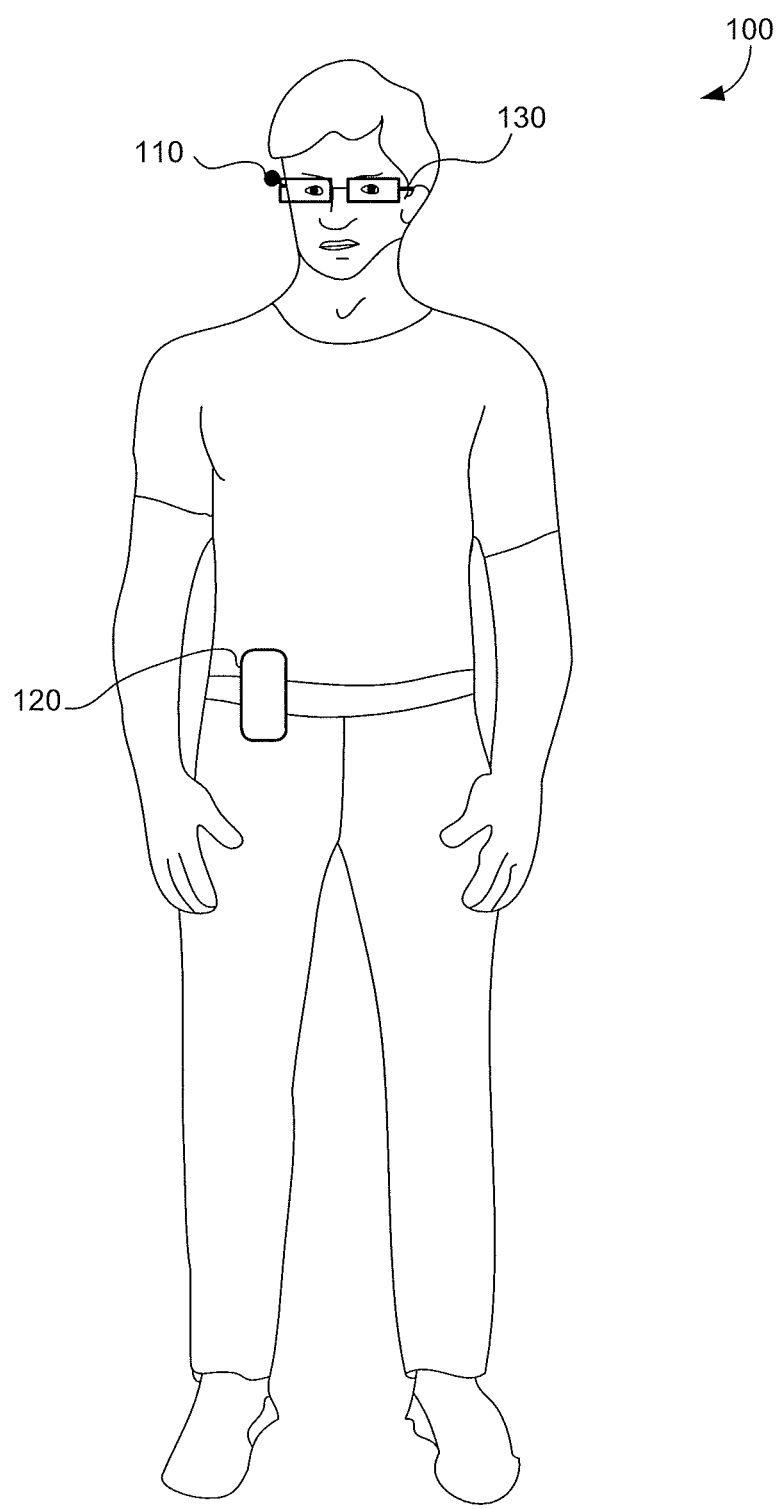
FIG. 1A is a schematic illustration of an example of a user wearing a wearable camera system according to a disclosed embodiment.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1A illustrates a user 100 wearing an apparatus 110 that is physically connected (or integral) to glasses 130, consistent with the disclosed embodiments. Glasses 130 may be prescription glasses, magnifying glasses, non-prescription glasses, safety glasses, sunglasses, etc. Additionally, in some embodiments, glasses 130 may include parts of a frame and earpieces, nosepieces, etc., and one or more lenses. Thus, in some embodiments, glasses 130 may function primarily to support apparatus 110, and/or an augmented reality display device or other optical display device. In some embodiments, apparatus 110 may include an image sensor (not shown in FIG. 1A) for capturing real-time image data of the field-of-view of user 100. The term "image data" includes any form of data retrieved from optical signals in the near-infrared, infrared, visible, and ultraviolet spectrums. The image data may include video clips and/or photographs.

In some embodiments, apparatus 110 may communicate wirelessly or via a wire with a computing device 120. In some embodiments, computing device 120 may include, for example, a smartphone, or a tablet, or a dedicated processing unit, which may be portable (e.g., can be carried in a pocket of user 100). Although shown in FIG. 1A as an external device, in some embodiments, computing device 120 may be provided as part of wearable apparatus 110 or glasses 130, whether integral thereto or mounted thereon. In some embodiments, computing device 120 may be included in an augmented reality display device or optical head mounted display provided integrally or mounted to glasses 130. In other embodiments, computing device 120 may be provided as part of another wearable or portable apparatus of user 100 including a wrist-strap, a multifunctional watch, a button, a clip-on, etc. And in other embodiments, computing device 120 may be provided as part of another system, such as an on-board automobile computing or navigation system. A person skilled in the art can appreciate that different types of computing devices and arrangements of devices may implement the functionality of the disclosed embodiments. Accordingly, in other implementations, computing device 120 may include a Personal Computer (PC), laptop, an Internet server, etc.

Figure 1B:
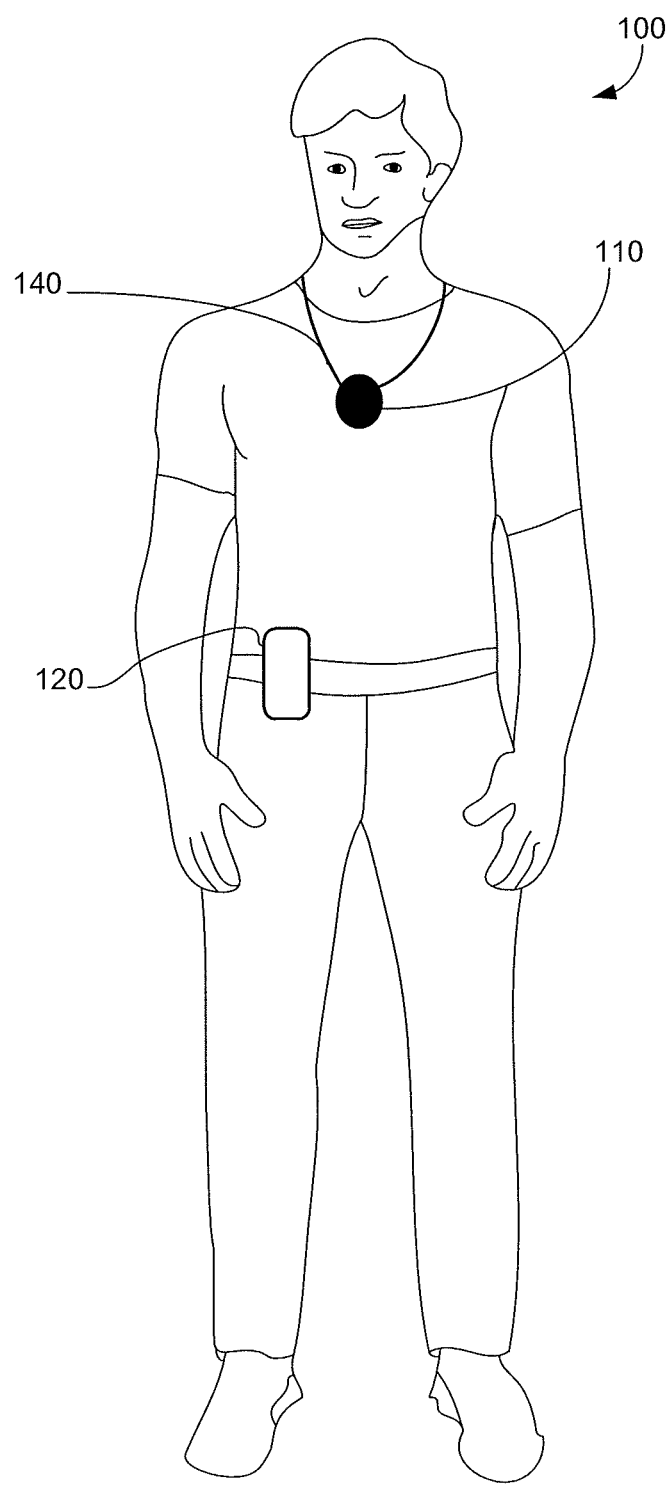
FIG. 1B is a schematic illustration of an example of the user wearing a wearable camera system according to a disclosed embodiment.

FIG. 1B illustrates user 100 wearing apparatus 110 that is physically connected to a necklace 140, consistent with a disclosed embodiment. Such a configuration of apparatus 110 may be suitable for users that do not wear glasses some or all of the time. In this embodiment, user 100 can easily wear apparatus 110, and take it off.

Figure 1C:
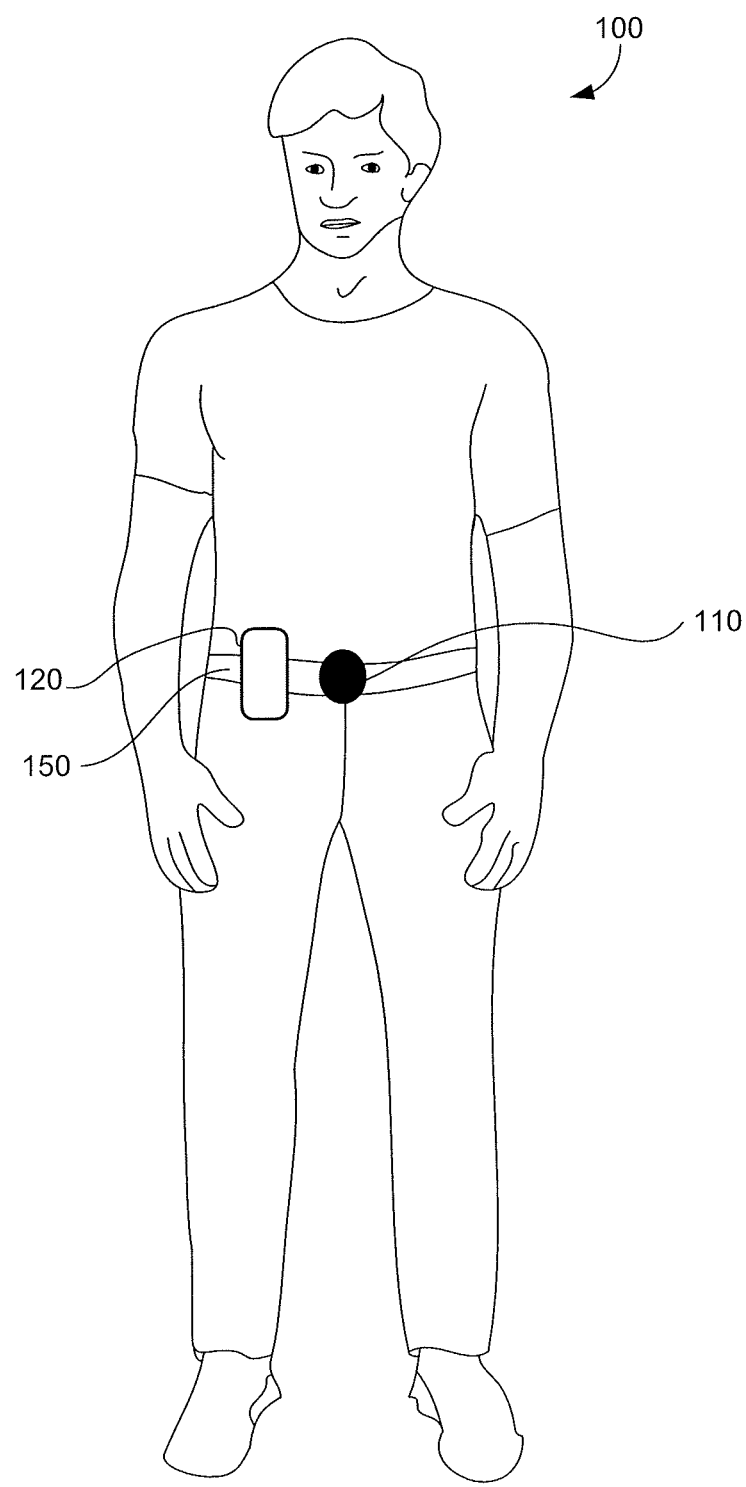
FIG. 1C is a schematic illustration of an example of the user wearing a wearable camera system according to a disclosed embodiment.

FIG. 1C illustrates user 100 wearing apparatus 110 that is physically connected to a belt 150, consistent with a disclosed embodiment. Such a configuration of apparatus 110 may be designed as a belt buckle. Alternatively, apparatus 110 may include a clip for attaching to various clothing articles, such as belt 150, or a vest, a pocket, a collar, a cap or hat or other portion of a clothing article.

Figure 1D:
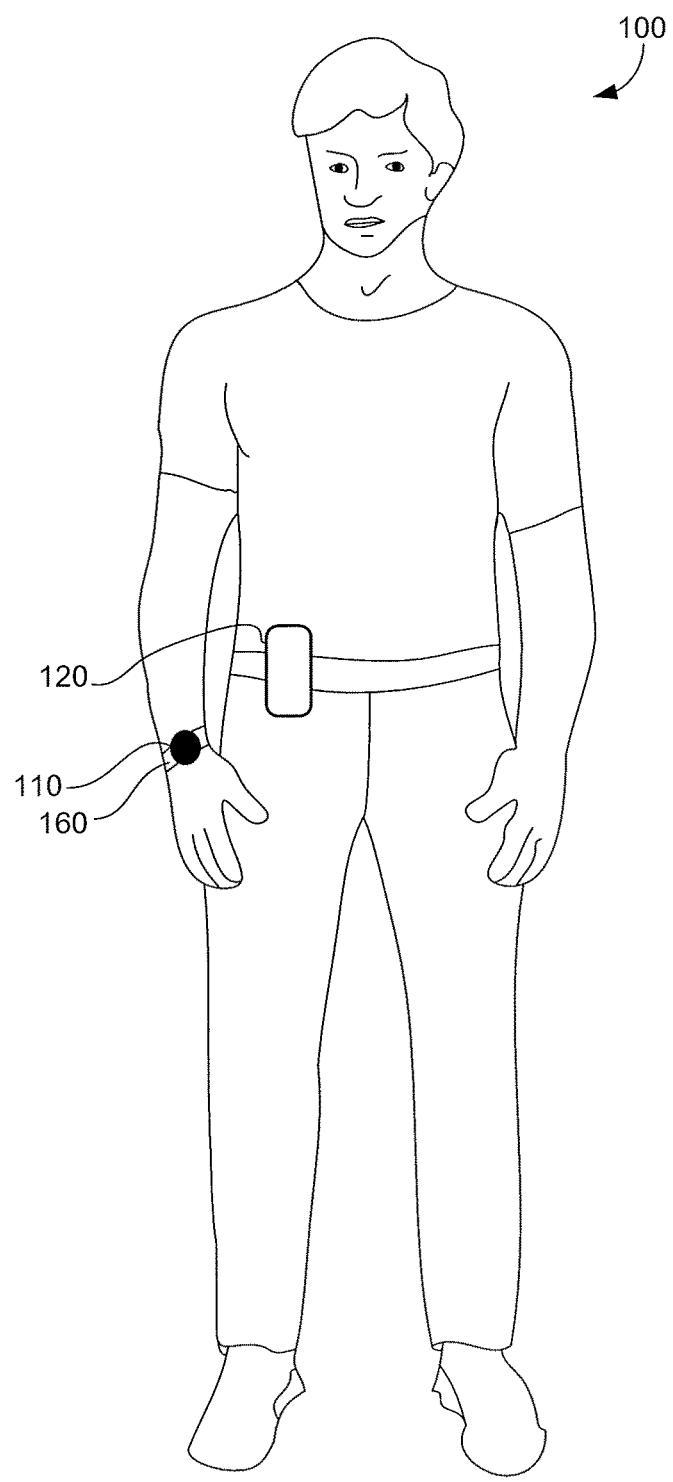
FIG. 1D is a schematic illustration of an example of the user wearing a wearable camera system according to a disclosed embodiment.

FIG. 1D illustrates user 100 wearing apparatus 110 that is physically connected to a wrist strap 160, consistent with a disclosed embodiment. Although the aiming direction of apparatus 110, according to this embodiment, may not match the field-of-view of user 100, apparatus 110 may include the ability to identify a hand-related trigger based on the tracked eye movement of a user 100 indicating that user 100 is looking in the direction of the wrist strap 160. Wrist strap 160 may also include an accelerometer, a gyroscope, or other sensor for determining movement or orientation of a user's 100 hand for identifying a hand-related trigger.

Figure 2:
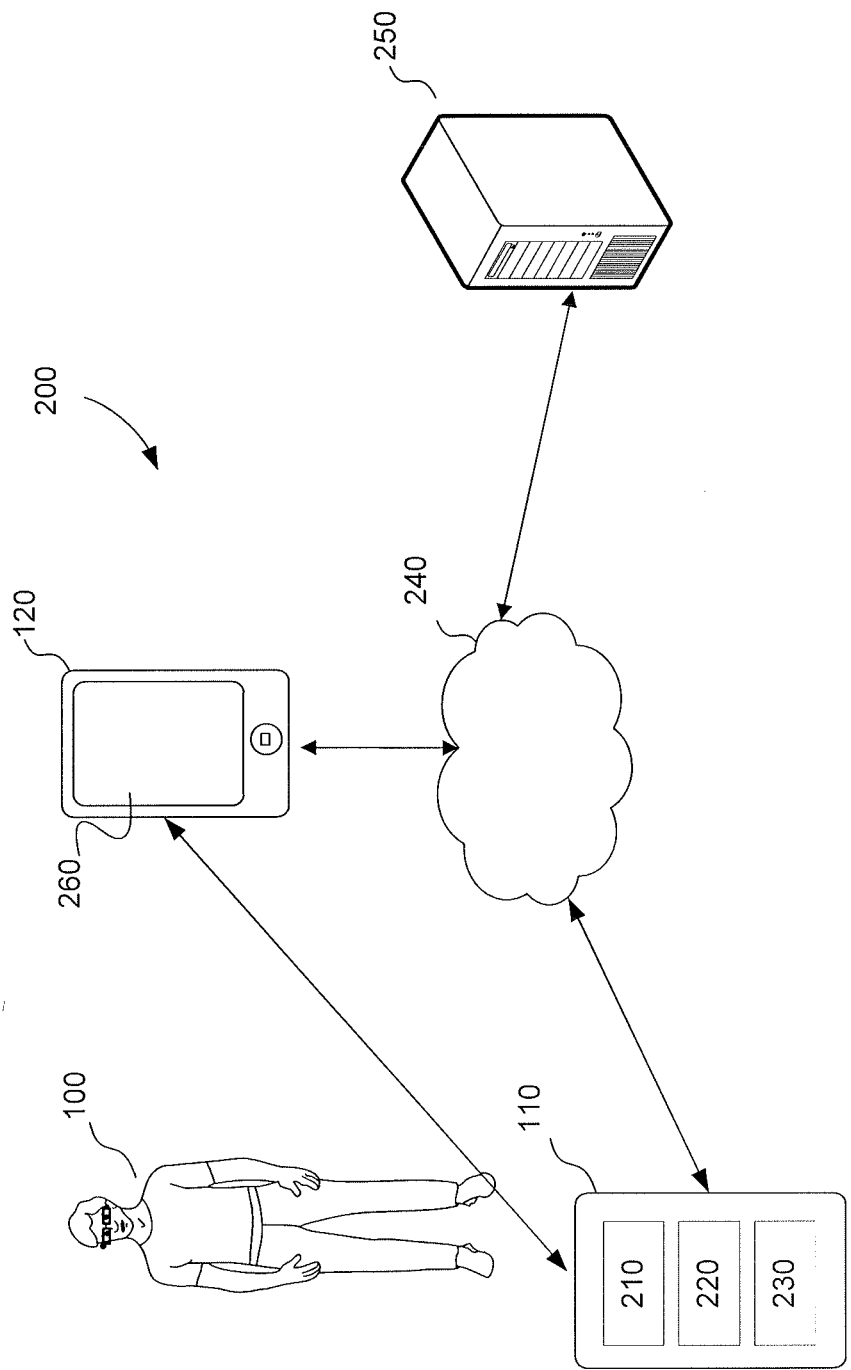
FIG. 2 is a schematic illustration of an example system consistent with the disclosed embodiments.

FIG. 2 is a schematic illustration of an exemplary system 200 including a wearable apparatus 110, worn by user 100, and an optional computing device 120 and/or a server 250 capable of communicating with apparatus 110 via a network 240, consistent with disclosed embodiments. In some embodiments, apparatus 110 may capture and analyze image data, identify a hand-related trigger present in the image data, and perform an action and/or provide feedback to a user 100, based at least in part on the identification of the hand-related trigger. In some embodiments, optional computing device 120 and/or server 250 may provide additional functionality to enhance interactions of user 100 with his or her environment, as described in greater detail below.

According to the disclosed embodiments, apparatus 110 may include an image sensor system 220 for capturing real-time image data of the field-of-view of user 100. In some embodiments, apparatus 110 may also include a processing unit 210 for controlling and performing the disclosed functionality of apparatus 110, such as to control the capture of image data, analyze the image data, and perform an action and/or output a feedback based on a hand-related trigger identified in the image data. According to the disclosed embodiments, a hand-related trigger may include a gesture performed by user 100 involving a portion of a hand of user 100. Further, consistent with some embodiments, a hand-related trigger may include a wrist-related trigger. Additionally, in some embodiments, apparatus 110 may include a feedback outputting unit 230 for producing an output of information to user 100.

As discussed above, apparatus 110 may include an image sensor 220 for capturing image data. The term "image sensor" refers to a device capable of detecting and converting optical signals in the near-infrared, infrared, visible, and ultraviolet spectrums into electrical signals. The electrical signals may be used to form an image or a video stream (i.e. image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 220 may be part of a camera included in apparatus 110.

Apparatus 110 may also include a processor 210 for controlling image sensor 220 to capture image data and for analyzing the image data according to the disclosed embodiments. As discussed in further detail below with respect to FIG. 5A, processor 210 may include a "processing device" for performing logic operations on one or more inputs of image data and other data according to stored or accessible software instructions providing desired functionality. In some embodiments, processor 210 may also control feedback outputting unit 230 to provide feedback to user 100 including information based on the analyzed image data and the stored software instructions. As the term is used herein, a "processing device" may access memory where executable instructions are stored or, in some embodiments, a "processing device" itself may include executable instructions (e.g., stored in memory included in the processing device).

In some embodiments, the information or feedback information provided to user 100 may include time information. The time information may include any information related to a current time of day and, as described further below, may be presented in any sensory perceptive manner. In some embodiments, time information may include a current time of day in a preconfigured format (e.g., 2:30 pm or 14:30). Time information may include the time in the user's current time zone (e.g., based on a determined location of user 100), as well as an indication of the time zone and/or a time of day in another desired location. In some embodiments, time information may include a number of hours or minutes relative to one or more predetermined times of day. For example, in some embodiments, time information may include an indication that three hours and fifteen minutes remain until a particular hour (e.g., until 6:00 pm), or some other predetermined time. Time information may also include a duration of time passed since the beginning of a particular activity, such as the start of a meeting or the start of a jog, or any other activity. In some embodiments, the activity may be determined based on analyzed image data. In other embodiments, time information may also include additional information related to a current time and one or more other routine, periodic, or scheduled events. For example, time information may include an indication of the number of minutes remaining until the next scheduled event, as may be determined from a calendar function or other information retrieved from computing device 120 or server 250, as discussed in further detail below.

Feedback outputting unit 230 may include one or more feedback systems for providing the output of information to user 100. In the disclosed embodiments, the audible or visual feedback may be provided via any type of connected audible or visual system or both. Feedback of information according to the disclosed embodiments may include audible feedback to user 100 (e.g., using a Bluetooth™ or other wired or wirelessly connected speaker, or a bone conduction headphone). Feedback outputting unit 230 of some embodiments may additionally or alternatively produce a visible output of information to user 100, for example, as part of an augmented reality display projected onto a lens of glasses 130 or provided via a separate heads up display in communication with apparatus 110, such as a display 260 provided as part of computing device 120, which may include an onboard automobile heads up display, an augmented reality device, a virtual reality device, a smartphone, PC, table, etc.

The term "computing device" refers to a device including a processing unit and having computing capabilities. Some examples of computing device 120 include a PC, laptop, tablet, or other computing systems such as an on-board computing system of an automobile, for example, each configured to communicate directly with apparatus 110 or server 250 over network 240. Another example of computing device 120 includes a smartphone having a display 260. In some embodiments, computing device 120 may be a computing system configured particularly for apparatus 110, and may be provided integral to apparatus 110 or tethered thereto. Apparatus 110 can also connect to computing device 120 over network 240 via any known wireless standard (e.g., Wi-Fi, Bluetooth®, etc.), as well as near-field capacitive coupling, and other short range wireless techniques, or via a wired connection. In an embodiment in which computing device 120 is a smartphone, computing device 120 may have a dedicated application installed therein. For example, user 100 may view on display 260 data (e.g., images, video clips, extracted information, feedback information, etc.) that originate from or are triggered by apparatus 110. In addition, user 100 may select part of the data for storage in server 250.

Network 240 may be a shared, public, or private network, may encompass a wide area or local area, and may be implemented through any suitable combination of wired and/or wireless communication networks. Network 240 may further comprise an intranet or the Internet. In some embodiments, network 240 may include short range or near-field wireless communication systems for enabling communication between apparatus 110 and computing device 120 provided in close proximity to each other, such as on or near a user's person, for example. Apparatus 110 may establish a connection to network 240 autonomously, for example, using a wireless module (e.g., Wi-Fi, cellular). In some embodiments, apparatus 110 may use the wireless module when being connected to an external power source, to prolong battery life. Further, communication between apparatus 110 and server 250 may be accomplished through any suitable communication channels, such as, for example, a telephone network, an extranet, an intranet, the Internet, satellite communications, off-line communications, wireless communications, transponder communications, a local area network (LAN), a wide area network (WAN), and a virtual private network (VPN).

As shown in FIG. 2, apparatus 110 may transfer or receive data to/from server 250 via network 240. In the disclosed embodiments, the data being received from server 250 and/or computing device 120 may include numerous different types of information based on the analyzed image data, including information related to a commercial product, or a person's identity, an identified landmark, and any other information capable of being stored in or accessed by server 250. In some embodiments, data may be received and transferred via computing device 120. Server 250 and/or computing device 120 may retrieve information from different data sources (e.g., a user specific database or a user's social network account or other account, the Internet, and other managed or accessible databases) and provide information to apparatus 110 related to the analyzed image data and a recognized trigger according to the disclosed embodiments. In some embodiments, calendar-related information retrieved from the different data sources may be analyzed to provide certain time information or a time-based context for providing certain information based on the analyzed image data.

Figure 3A:
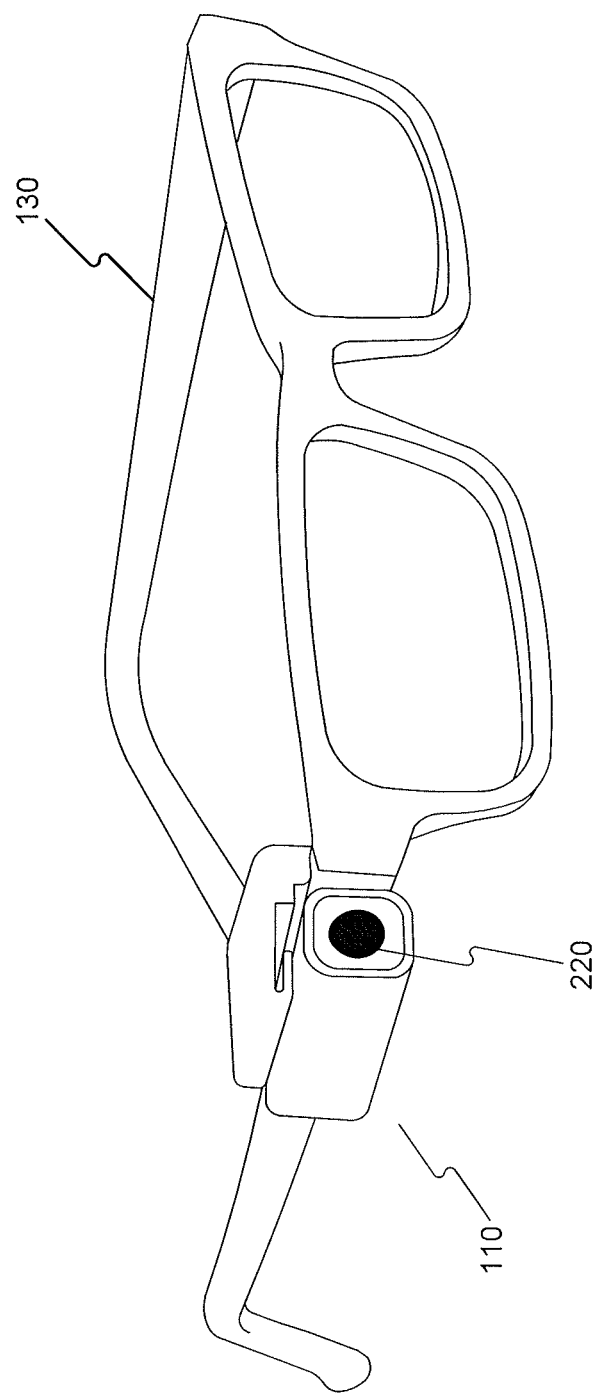
FIG. 3A is a schematic illustration of an example of the wearable camera system shown in FIG. 1A.

An example wearable apparatus 110 incorporated with glasses 130 according to some embodiments (as discussed in connection with FIG. 1A) is shown in greater detail in FIG. 3A. In some embodiments, apparatus 110 may be associated with a structure (not shown in FIG. 3A) that enables easy detaching and reattaching of apparatus 110 to glasses 130. In some embodiments, when apparatus 110 attaches to glasses 130, image sensor 220 acquires a set aiming direction without the need for directional calibration. The set aiming direction of image sensor 220 may substantially coincide with the field-of-view of user 100. For example, a camera associated with image sensor 220 may be installed within apparatus 110 in a predetermined angle in a position facing slightly downwards (e.g., 5-15 degrees from the horizon). Accordingly, the set aiming direction of image sensor 220 may substantially match the field-of-view of user 100.

FIG. 3B is an exploded view of the components of the embodiment discussed regarding FIG. 3A. Attaching apparatus 110 to glasses 130 may take place in the following way. Initially, a support 310 may be mounted on glasses 130 using a screw 320, in the side of support 310. Then, apparatus 110 may be clipped on support 310 such that it is aligned with the field-of-view of user 100. The term "support" includes any device or structure that enables detaching and reattaching of a device including a camera to a pair of glasses or to another object (e.g., a helmet). Support 310 may be made from plastic (e.g., polycarbonate), metal (e.g., aluminum), or a combination of plastic and metal (e.g., carbon fiber graphite). Support 310 may be mounted on any kind of glasses (e.g., eyeglasses, sunglasses, 3D glasses, safety glasses, etc.) using screws, bolts, snaps, or any fastening means used in the art.

In some embodiments, support 310 may include a quick release mechanism for disengaging and reengaging apparatus 110. For example, support 310 and apparatus 110 may include magnetic elements. As an alternative example, support 310 may include a male latch member and apparatus 110 may include a female receptacle. In other embodiments, support 310 can be an integral part of a pair of glasses, or sold separately and installed by an optometrist. For example, support 310 may be configured for mounting on the anus of glasses 130 near the frame front, but before the hinge. Alternatively, support 310 may be configured for mounting on the bridge of glasses 130.

In some embodiments, apparatus 110 may be provided as part of a glasses frame 130, with or without lenses. Additionally, in some embodiments, apparatus 110 may be configured to provide an augmented reality display projected onto a lens of glasses 130 (if provided), or alternatively, may include a display for projecting time information, for example, according to the disclosed embodiments. Apparatus 110 may include the additional display or alternatively, may be in communication with a separately provided display system that may or may not be attached to glasses 130.

Figure 4A:
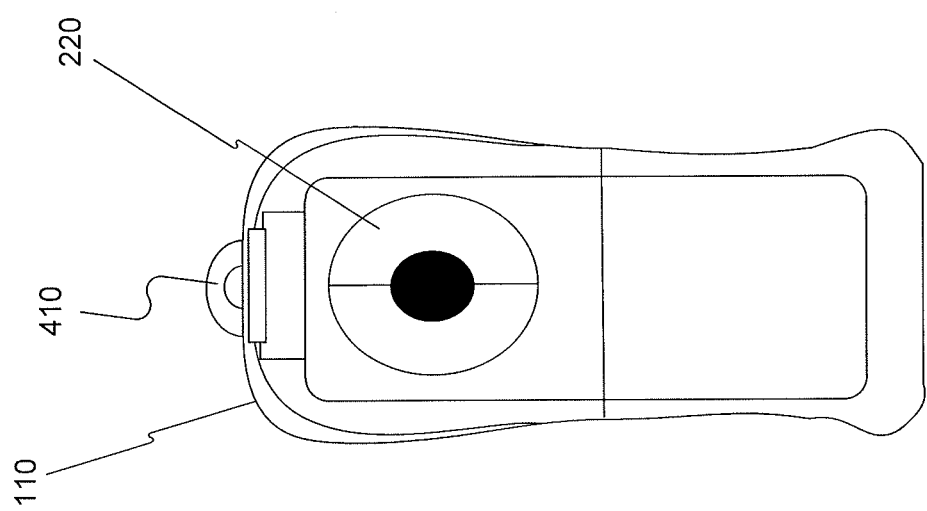
FIG. 4A is a schematic illustration of an example of the wearable camera system shown in FIG. 1B from a first viewpoint.

In some embodiments, apparatus 110 may be implemented in a form other than wearable glasses, as described above with respect to FIGS. 1B-1D, for example. FIG. 4A is a schematic illustration of an example of an additional embodiment of apparatus 110 from a first viewpoint. The viewpoint shown in FIG. 4A is from the front of apparatus 110. Apparatus 110 includes an image sensor 220, a clip (not shown), a function button (not shown) and a hanging ring 410 for attaching apparatus 110 to, for example, necklace 140, as shown in FIG. 1B. When apparatus 110 hangs on necklace 140, the aiming direction of image sensor 220 may not fully coincide with the field-of-view of user 100, but the aiming direction would still correlate with the field-of-view of user 100.

Figure 4B:
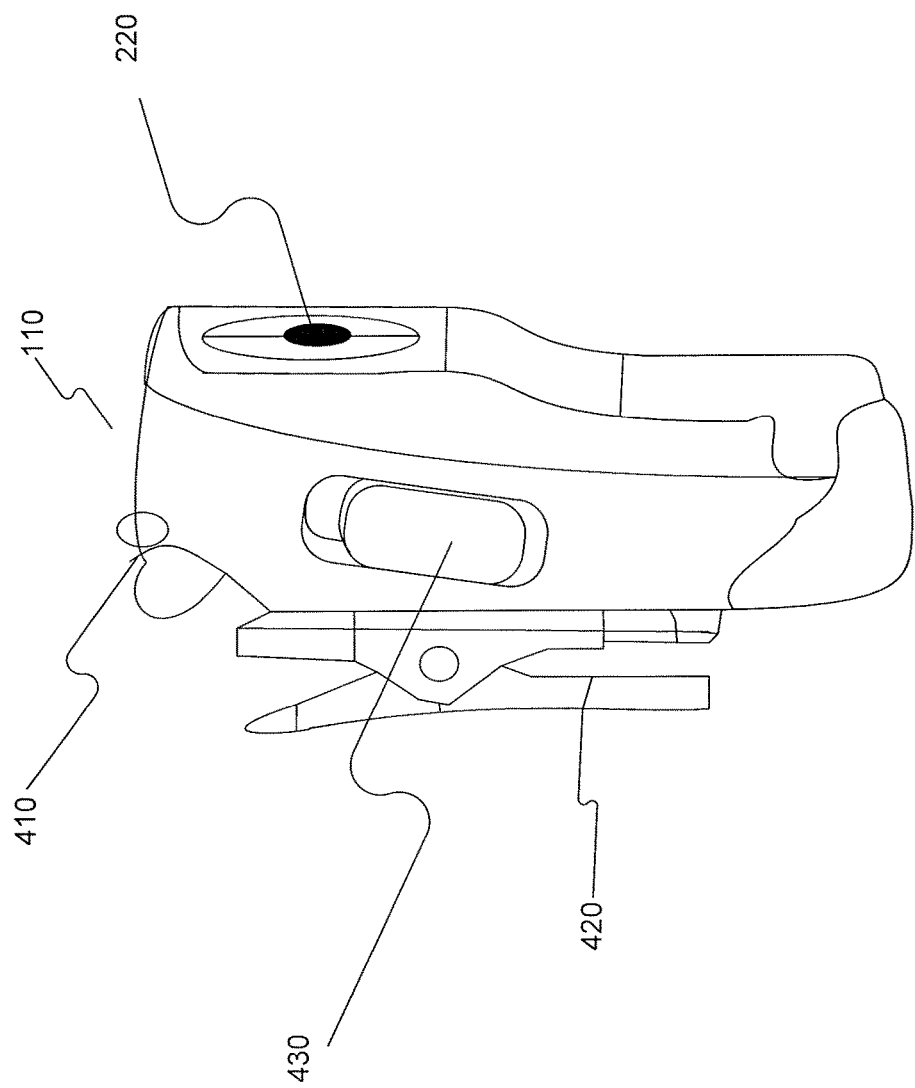
FIG. 4B is a schematic illustration of the example of the wearable camera system shown in FIG. 1B from a second viewpoint.

FIG. 4B is a schematic illustration of the example of a second embodiment of apparatus 110, from a second viewpoint. The viewpoint shown in FIG. 4B is from a side orientation of apparatus 110. In addition to hanging ring 410, as shown in FIG. 4B, apparatus 110 may further include a clip 420. User 100 can use clip 420 to attach apparatus 110 to a shirt or belt 150, as illustrated in FIG. 1C. Clip 420 may provide an easy mechanism for disengaging and reengaging apparatus 110 from different articles of clothing. In other embodiments, apparatus 110 may include a female receptacle for connecting with a male latch of a car mount or universal stand.

In some embodiments, apparatus 110 includes a function button 430 for enabling user 100 to provide input to apparatus 110. Function button 430 may accept different types of tactile input (e.g., a tap, a click, a double-click, a long press, a right-to-left slide, a left-to-right slide). In some embodiments, each type of input may be associated with a different action. For example, a tap may be associated with the function of taking a picture, while a right-to-left slide may be associated with the function of recording a video.

The example embodiments discussed above with respect to FIGS. 3A, 3B, 4A, and 4B are not limiting. In some embodiments, apparatus 110 may be implemented in any suitable configuration for performing the disclosed methods. For example, referring back to FIG. 2, the disclosed embodiments may implement an apparatus 110 according to any configuration including an image sensor 220 and a processor unit 210 to perform image analysis and for communicating with a feedback unit 230.

Figure 5A:
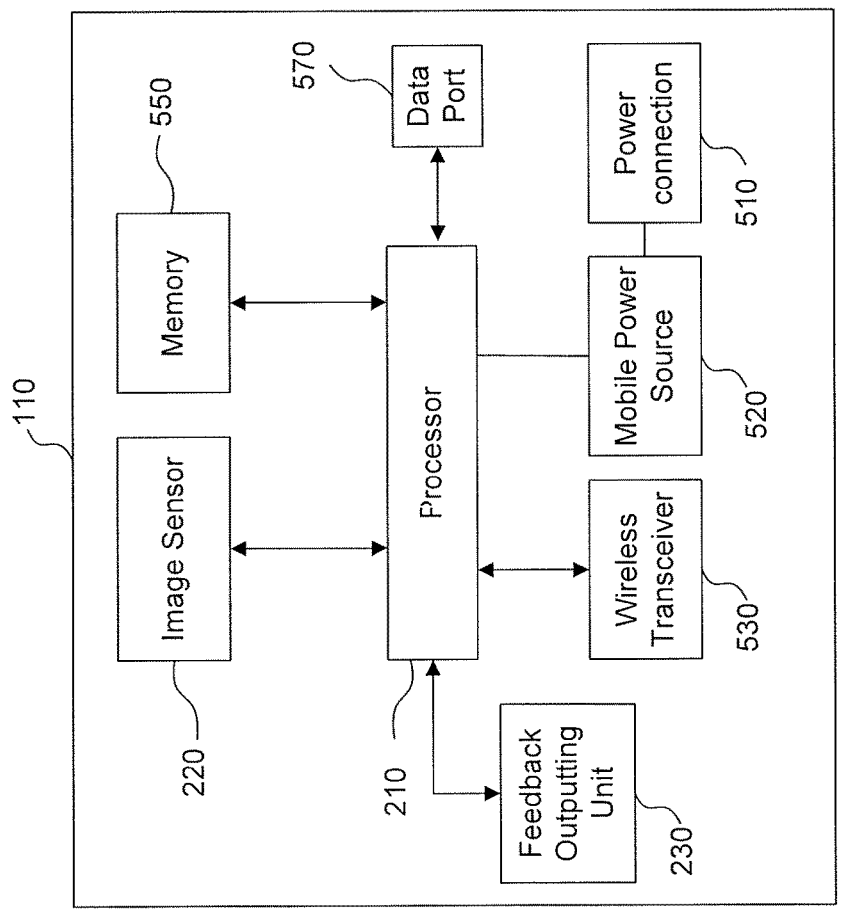
FIG. 5A is a block diagram illustrating an example of the components of a wearable camera system according to a first embodiment.

FIG. 5A is a block diagram illustrating the components of apparatus 110 according to an example embodiment. As shown in FIG. 5A, and as similarly discussed above, apparatus 110 includes an image sensor 220, a memory 550, a processor 210, a feedback outputting unit 230, a wireless transceiver 530, and a mobile power source 520. In other embodiments, apparatus 110 may also include buttons, other sensors such as a microphone, and inertial measurements devices such as accelerometers, gyroscopes, magnetometers, temperature sensors, color sensors, light sensors, etc. Apparatus 110 may further include a data port 570 and a power connection 510 with suitable interfaces for connecting with an external power source or an external device (not shown).

Processor 210, depicted in FIG. 5A, may include any suitable processing device. The term "processing device" includes any physical device having an electric circuit that performs a logic operation on input or inputs. For example, processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the processing device may, for example, be pre-loaded into a memory integrated with or embedded into the processing device or may be stored in a separate memory (e.g., memory 550). Memory 550 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Although, in the embodiment illustrated in FIG. 5A, apparatus 110 includes one processing device (e.g., processor 210), apparatus 110 may include more than one processing device. Each processing device may have a similar construction, or the processing devices may be of differing constructions that are electrically connected or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact.

In some embodiments, processor 210 may process a plurality of images captured from the environment of user 100 to determine different parameters related to capturing subsequent images. For example, processor 210 can determine, based on information derived from captured image data, a value for at least one of the following: an image resolution, a compression ratio, a cropping parameter, frame rate, a focus point, an exposure time, an aperture size, and a light sensitivity. The determined value may be used in capturing at least one subsequent image. Additionally, processor 210 can detect images including at least one hand-related trigger in the environment of the user and perform an action and/or provide an output of information to a user via feedback outputting unit 230.

In another embodiment, processor 210 can change the aiming direction of image sensor 220. For example, when apparatus 110 is attached with clip 420, the aiming direction of image sensor 220 may not coincide with the field-of-view of user 100. Processor 210 may recognize certain situations from the analyzed image data and adjust the aiming direction of image sensor 220 to capture relevant image data. For example, in one embodiment, processor 210 may detect an interaction with another individual and sense that the individual is not fully in view, because image sensor 220 is tilted down. Responsive thereto, processor 210 may adjust the aiming direction of image sensor 220 to capture image data of the individual. Other scenarios are also contemplated where processor 210 may recognize the need to adjust an aiming direction of image sensor 220.

In some embodiments, processor 210 may communicate data to feedback-outputting unit 230, which may include any device configured to provide information to a user 100. Feedback outputting unit 230 may be provided as part of apparatus 110 (as shown) or may be provided external to apparatus 110 and communicatively coupled thereto. Feedback-outputting unit 230 may be configured to output visual or nonvisual feedback based on signals received from processor 210, such as when processor 210 recognizes a hand-related trigger in the analyzed image data.

The tenor "feedback" refers to any output or information provided in response to processing at least one image in an environment. In some embodiments, as similarly described above, feedback may include an audible or visible indication of time information, detected text or numerals, the value of currency, a branded product, a person's identity, the identity of a landmark or other environmental situation or condition including the street names at an intersection or the color of a traffic light, etc., as well as other information associated with each of these. For example, in some embodiments, feedback may include additional information regarding the amount of currency still needed to complete a transaction, information regarding the identified person, historical information or times and prices of admission etc. of a detected landmark etc. In some embodiments, feedback may include an audible tone, a tactile response, and/or information previously recorded by user 100. Feedback-outputting unit 230 may comprise appropriate components for outputting acoustical and tactile feedback. For example, feedback-outputting unit 230 may comprise audio headphones, a hearing aid type device, a speaker, a bone conduction headphone, interfaces that provide tactile cues, vibrotactile stimulators, etc. In some embodiments, processor 210 may communicate signals with an external feedback outputting unit 230 via a wireless transceiver 530, a wired connection, or some other communication interface. In some embodiments, feedback outputting unit 230 may also include any suitable display device for visually displaying information to user 100.

As shown in FIG. 5A, apparatus 110 includes memory 550. Memory 550 may include one or more sets of instructions accessible to processor 210 to perform the disclosed methods, including instructions for recognizing a hand-related trigger in the image data. In some embodiments memory 550 may store image data (e.g., images, videos) captured from the environment of user 100. In addition, memory 550 may store information specific to user 100, such as image representations of known individuals, favorite products, personal items, and calendar or appointment information, etc. In some embodiments, processor 210 may determine, for example, which type of image data to store based on available storage space in memory 550. In another embodiment, processor 210 may extract information from the image data stored in memory 550.

As further shown in FIG. 5A, apparatus 110 includes mobile power source 520. The term "mobile power source" includes any device capable of providing electrical power, which can be easily carried by hand (e.g., mobile power source 520 may weigh less than a pound). The mobility of the power source enables user 100 to use apparatus 110 in a variety of situations. In some embodiments, mobile power source 520 may include one or more batteries (e.g., nickel-cadmium batteries, nickel-metal hydride batteries, and lithium-ion batteries) or any other type of electrical power supply. In other embodiments, mobile power source 520 may be rechargeable and contained within a casing that holds apparatus 110. In yet other embodiments, mobile power source 520 may include one or more energy harvesting devices for converting ambient energy into electrical energy (e.g., portable solar power units, human vibration units, etc.).

Mobile power source 510 may power one or more wireless transceivers (e.g., wireless transceiver 530 in FIG. 5A). The term "wireless transceiver" refers to any device configured to exchange transmissions over an air interface by use of radio frequency, infrared frequency, magnetic field, or electric field. Wireless transceiver 530 may use any known standard to transmit and/or receive data (e.g., Wi-Fi, Bluetooth®, Bluetooth Smart, 802.15.4, or ZigBee). In some embodiments, wireless transceiver 530 may transmit data (e.g., raw image data, processed image data, extracted information) from apparatus 110 to computing device 120 and/or server 250. Wireless transceiver 530 may also receive data from computing device 120 and/or server 250. In other embodiments, wireless transceiver 530 may transmit data and instructions to an external feedback outputting unit 230.

Figure 5B:
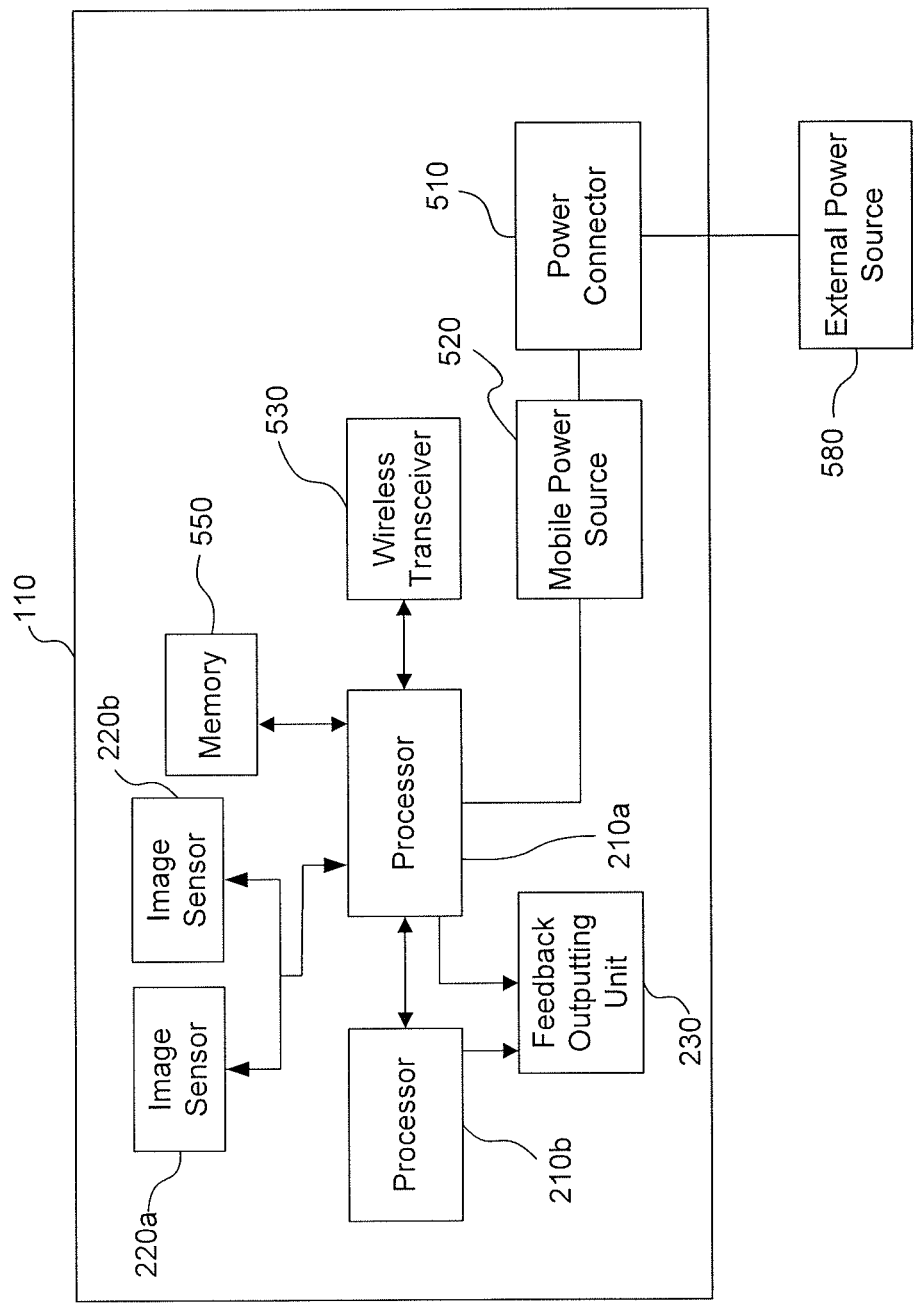
FIG. 5B is a block diagram illustrating an example of the components of a wearable camera system according to a second embodiment.

FIG. 5B is a block diagram illustrating the components of apparatus 110 according to another example embodiment. In some embodiments, apparatus 110 includes a first image sensor 220a, a second image sensor 220b, a memory 550, a first processor 210a, a second processor 210b, a feedback outputting unit 230, a wireless transceiver 530, a mobile power source 520, and a power connector 510. In the arrangement shown in FIG. 5B, each of the image sensors may provide images in a different image resolution, or face a different direction. Alternatively, each image sensor may be associated with a different camera (e.g., a wide angle camera, a narrow angle camera, an IR camera, etc.). In some embodiments, apparatus 110 can select which image sensor to use based on various factors. For example, processor 210a may determine, based on available storage space in memory 550, to capture subsequent images in a certain resolution.

Apparatus 110 may operate in a first processing-mode and in a second processing-mode, such that the first processing-mode may consume less power than the second processing-mode. For example, in the first processing-mode, apparatus 110 may capture images and process the captured images to make real-time decisions based on an identified hand-related trigger, for example. In the second processing-mode, apparatus 110 may extract information from stored images in memory 550 and delete images from memory 550. In some embodiments, mobile power source 520 may provide more than fifteen hours of processing in the first processing-mode and about three hours of processing in the second processing-mode. Accordingly, different processing-modes may allow mobile power source 520 to produce sufficient power for powering apparatus 110 for various time periods (e.g., more than two hours, more than four hours, more than ten hours, etc.).

In some embodiments, apparatus 110 may use first processor 210a in the first processing-mode when powered by mobile power source 520, and second processor 210b in the second processing-mode when powered by external power source 580 that is connectable via power connector 510. In other embodiments, apparatus 110 may determine, based on predefined conditions, which processors or which processing modes to use. Apparatus 110 may operate in the second processing-mode even when apparatus 110 is not powered by external power source 580. For example, apparatus 110 may determine that it should operate in the second processing-mode when apparatus 110 is not powered by external power source 580, if the available storage space in memory 550 for storing new image data is lower than a predefined threshold.

Although one wireless transceiver is depicted in FIG. 5B, apparatus 110 may include more than one wireless transceiver (e.g., two wireless transceivers). In an arrangement with more than one wireless transceiver, each of the wireless transceivers may use a different standard to transmit and/or receive data. In some embodiments, a first wireless transceiver may communicate with server 250 or computing device 120 using a cellular standard (e.g., LTE or GSM), and a second wireless transceiver may communicate with server 250 or computing device 120 using a short-range standard (e.g., Wi-Fi or Bluetooth®). In some embodiments, apparatus 110 may use the first wireless transceiver when the wearable apparatus is powered by a mobile power source included in the wearable apparatus, and use the second wireless transceiver when the wearable apparatus is powered by an external power source.

Figure 5C:
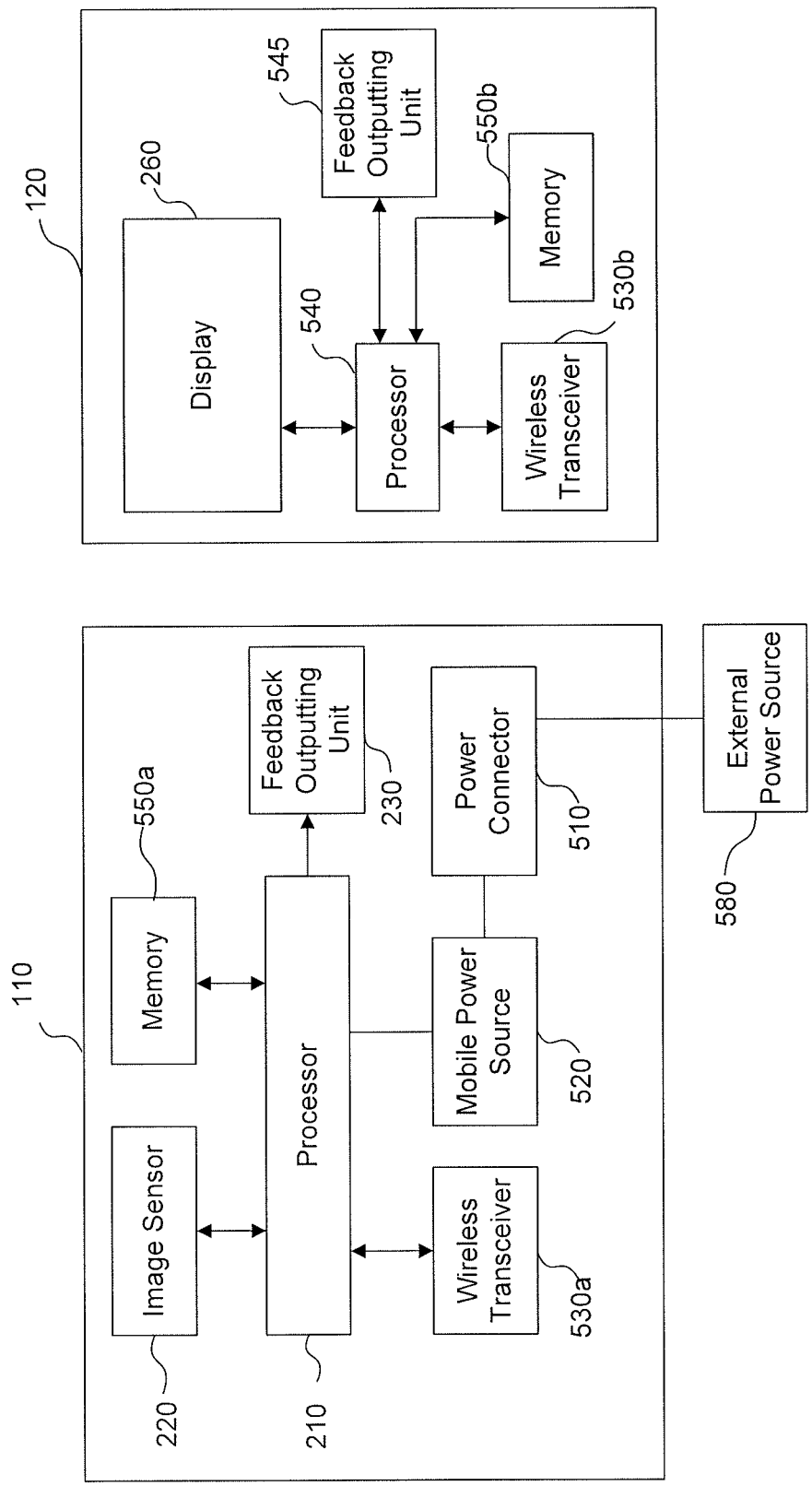
FIG. 5C is a block diagram illustrating an example of the components of a wearable camera system according to a third embodiment.

FIG. 5C is a block diagram illustrating the components of apparatus 110 according to another example embodiment including computing device 120. In this embodiment, apparatus 110 includes an image sensor 220, a memory 550a, a first processor 210, a feedback-outputting unit 230, a wireless transceiver 530a, a mobile power source 520, and a power connector 510. As further shown in FIG. 5C, computing device 120 includes a processor 540, a feedback-outputting unit 545, a memory 550b, a wireless transceiver 530b, and a display 260. One example of computing device 120 is a smartphone or tablet having a dedicated application installed therein. In other embodiments, computing device 120 may include any configuration such as an on-board automobile computing system, a PC, a laptop, and any other system consistent with the disclosed embodiments. In this example, user 100 may view feedback output in response to identification of a hand-related trigger on display 260. Additionally, user 100 may view other data (e.g., images, video clips, object information, schedule information, extracted information, etc.) on display 260. In addition, user 100 may communicate with server 250 via computing device 120.

In some embodiments, processor 210 and processor 540 are configured to extract information from captured image data. The term "extracting information" includes any process by which information associated with objects, individuals, locations, events, etc., is identified in the captured image data by any means known to those of ordinary skill in the art. In some embodiments, apparatus 110 may use the extracted information to send feedback or other real-time indications to feedback outputting unit 230 or to computing device 120. In some embodiments, processor 210 may identify in the image data the individual standing in front of user 100, and send computing device 120 the name of the individual and the last time user 100 met the individual. In another embodiment, processor 210 may identify in the image data, one or more visible triggers, including a hand-related trigger, and determine whether the trigger is associated with a person other than the user of the wearable apparatus to selectively determine whether to perform an action associated with the trigger. One such action may be to provide a feedback to user 100 via feedback-outputting unit 230 provided as part of (or in communication with) apparatus 110 or via a feedback unit 545 provided as part of computing device 120. For example, feedback-outputting unit 545 may be in communication with display 260 to cause the display 260 to visibly output information. In some embodiments, processor 210 may identify in the image data a hand-related trigger and send computing device 120 an indication of the trigger. Processor 540 may then process the received trigger information and provide an output via feedback outputting unit 545 or display 260 based on the hand-related trigger. In other embodiments, processor 540 may determine a hand-related trigger and provide suitable feedback similar to the above, based on image data received from apparatus 110. In some embodiments, processor 540 may provide instructions or other information, such as environmental information to apparatus 110 based on an identified hand-related trigger.

In some embodiments, processor 210 may identify other environmental information in the analyzed images, such as an individual standing in front user 100, and send computing device 120 information related to the analyzed information such as the name of the individual and the last time user 100 met the individual. In a different embodiment, processor 540 may extract statistical information from captured image data and forward the statistical information to server 250. For example, certain information regarding the types of items a user purchases, or the frequency a user patronizes a particular merchant, etc. may be determined by processor 540. Based on this information, server 250 may send computing device 120 coupons and discounts associated with the user's preferences.

When apparatus 110 is connected or wirelessly connected to computing device 120, apparatus 110 may transmit at least part of the image data stored in memory 550a for storage in memory 550b. In some embodiments, after computing device 120 confirms that transferring the part of image data was successful, processor 540 may delete the part of the image data. The term "delete" means that the image is marked as 'deleted' and other image data may be stored instead of it, but does not necessarily mean that the image data was physically removed from the memory.

As will be appreciated by a person skilled in the art having the benefit of this disclosure, numerous variations and/or modifications may be made to the disclosed embodiments. Not all components are essential for the operation of apparatus 110. Any component may be located in any appropriate apparatus and the components may be rearranged into a variety of configurations while providing the functionality of the disclosed embodiments. Therefore, the foregoing configurations are examples and, regardless of the configurations discussed above, apparatus 110 can capture, store, and process images.

Further, the foregoing and following description refers to storing and/or processing images or image data. In the embodiments disclosed herein, the stored and/or processed images or image data may comprise a representation of one or more images captured by image sensor 220. As the term is used herein, a "representation" of an image (or image data) may include an entire image or a portion of an image. A representation of an image (or image data) may have the same resolution or a lower resolution as the image (or image data), and/or a representation of an image (or image data) may be altered in some respect (e.g., be compressed, have a lower resolution, have one or more colors that are altered, etc.).

For example, apparatus 110 may capture an image and store a representation of the image that is compressed as a .JPG file. As another example, apparatus 110 may capture an image in color, but store a black-and-white representation of the color image. As yet another example, apparatus 110 may capture an image and store a different representation of the image (e.g., a portion of the image). For example, apparatus 110 may store a portion of an image that includes a face of a person who appears in the image, but that does not substantially include the environment surrounding the person. Similarly, apparatus 110 may, for example, store a portion of an image that includes a product that appears in the image, but does not substantially include the environment surrounding the product. As yet another example, apparatus 110 may store a representation of an image at a reduced resolution (i.e., at a resolution that is of a lower value than that of the captured image). Storing representations of images may allow apparatus 110 to save storage space in memory 550. Furthermore, processing representations of images may allow apparatus 110 to improve processing efficiency and/or help to preserve battery life.

In addition to the above, in some embodiments, any one of apparatus 110 or computing device 120, via processor 210 or 540, may further process the captured image data to provide additional functionality to recognize objects and/or gestures and/or other information in the captured image data. In some embodiments, actions may be taken based on the identified objects, gestures, or other information. In some embodiments, processor 210 or 540 may identify in the image data, one or more visible triggers, including a hand-related trigger, and determine whether the trigger is associated with a person other than the user to determine whether to perform an action associated with the trigger.

A wearable camera system (e.g., wearable apparatus 110) may provide social features to a user and/or other entities. For example, a wearable camera system may capture images from an environment of a corresponding user and produce image data from the captured images. The captured image data may be compared with image data captured by a user of another wearable camera system. The comparison of captured image data from two users may be used to produce a matching score between the users. The matching score may be used for a variety of purposes, such as identifying common interests, identifying common traits, and/or suggesting a possible match between the users. For example, captured image data that results in a high matching score may indicate that two users share recreational interests (e.g., both enjoy soccer).

Wearable camera systems may provide image data which may include images or video streams captured by an image sensor 220, 220a, and/or 220b included with and/or embedded in the wearable camera systems. The image data may also include information related to the images or video streams such as, for example, a location where the captured images were captured, a time when the captured images were captured, or information describing or identifying content in the captured images.

In some embodiments, a user may preset or preconfigure his or her own user information such as gender, age, weight, height, hair color, eye color, physical attributes of at least one of the at least two users, income level, education level, home address, work address, marital status, and/or postal code. Such information may be stored in, for example, a user profile. The user may configure the profile information using a wearable camera systems or a computing device in communication with the wearable camera systems via a wired or wireless communications connection. The profile information may be stored in a wearable camera system, a computing device, and/or a server. The profile information may be used for a variety of purposes. For example, this information may be used when determining a value of a matching score between users. The matching score may be used to suggest a possible match between at least two users, identify a common preference of at least two users, and/or build a social graph of at least two users. In some embodiments, the matching score may relate to a larger population of users (e.g., 3, 4, 5, 10, 50, 100, 500, 1,000 users, etc.)

Figure 6:
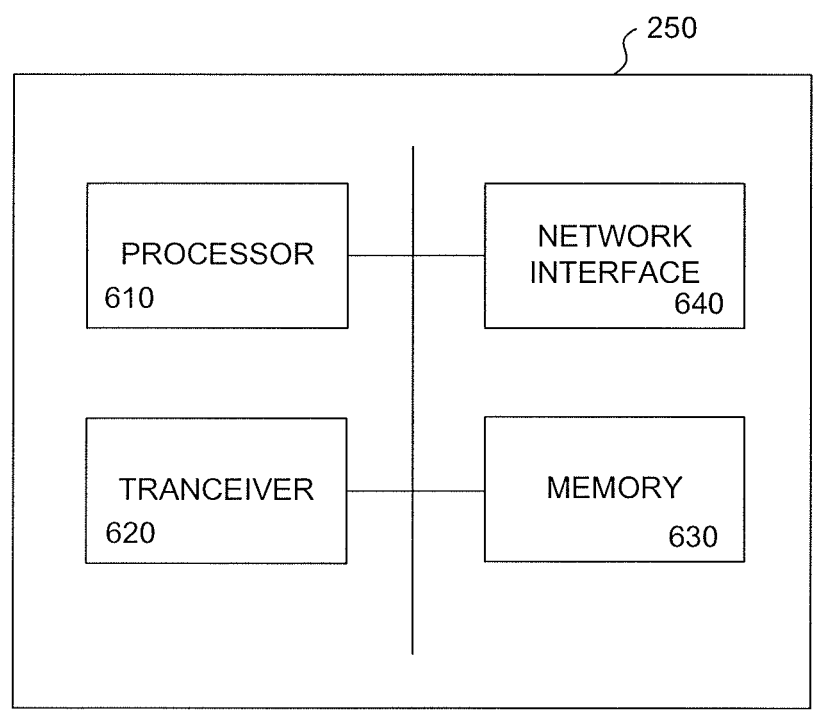
FIG. 6 is a block diagram illustrating an example of the components of a server.

FIG. 6 is a block diagram illustrating example components of server 250. Server 250 may include one or more processors 610, at least one transceiver 620, at least one memory 630, and at least one network interface 640. The one or more processors 610 may comprise a CPU (central processing unit) and may include a single core or multiple core processor system with parallel processing capability. The one or more processors 610 may use logical processors to simultaneously execute and control multiple processes. One of ordinary skill in the art will recognize that other types of processor arrangements could be implemented that provide for the capabilities disclosed herein.

Transceiver 620 may transmit or receive signals containing any kind of information to/from wearable camera systems or computing device 120 over network 240 via any known wireless standard (e.g., Wi-Fi, Bluetooth®, etc.), as well as near-filed capacitive coupling, and other short range wireless techniques, or via a wired connection.

Memory 630 may include one or more storage devices configured to store information used by the one or more processors 610 to perform certain functions according to exemplary embodiments. Memory 630 may include, for example, a hard drive, a flash drive, an optical drive, a random-access memory (RAM), a read-only memory (ROM), or any other computer-readable medium known in the art. Memory 630 may store instructions to be executed by the one or more processors 610. Memory 630 may be volatile or non-volatile, magnetic, semiconductor, optical, removable, non-removable, or other type of storage device or tangible computer-readable medium.

The network interface 640 may comprise wired links, such as an Ethernet cable or the like, and/or wireless links to access nodes and/or different networks. The network interface 640 may allow the one or more processors 610 to communicate with remote devices via, for example, network 240.

Figure 7A:
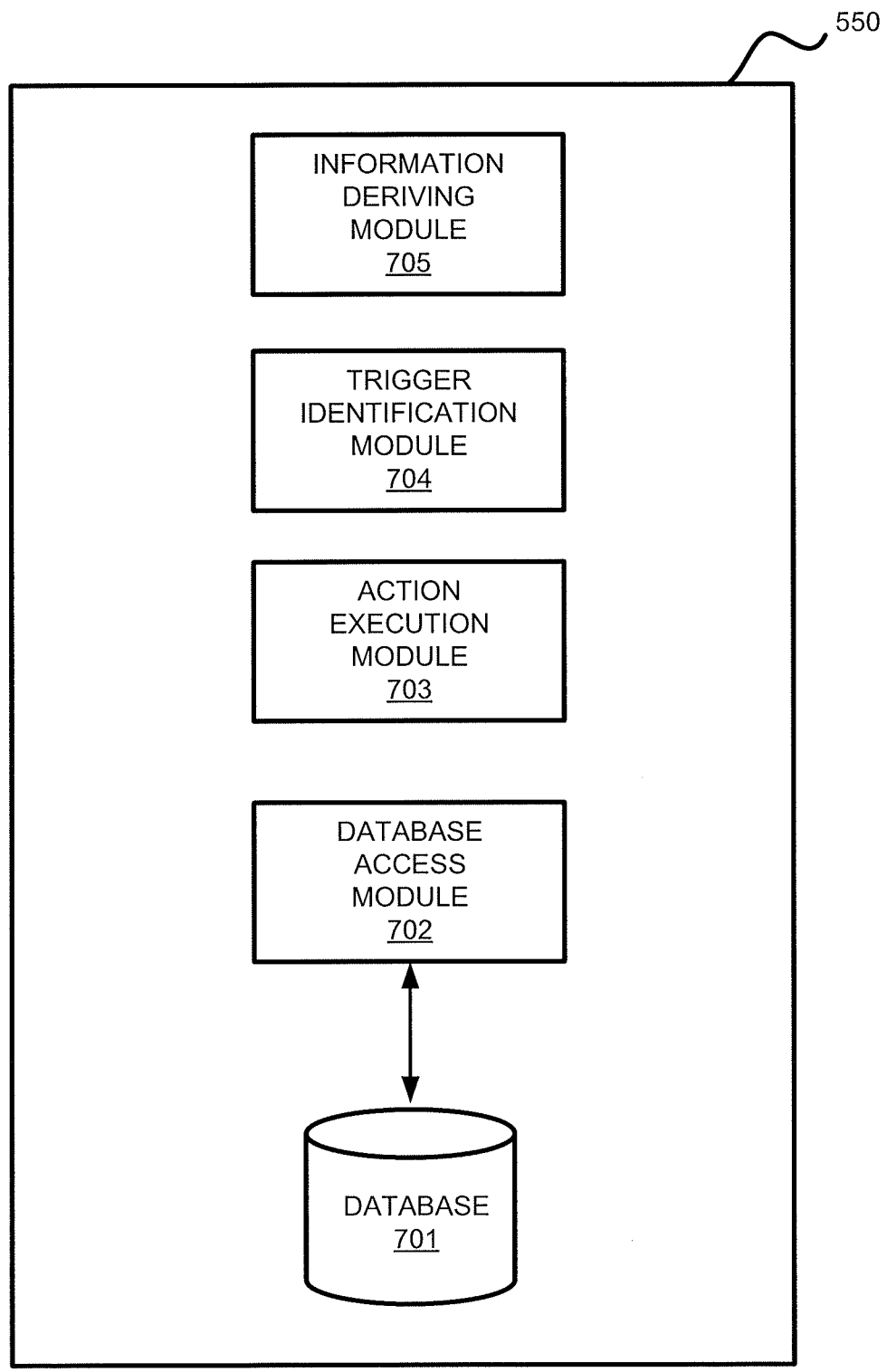
FIG. 7A is a block diagram illustrating an example memory of a wearable apparatus or a computing device storing a plurality of modules.

FIG. 7A is a block diagram illustrating an example memory (e.g., memory 550, 550a, and/or 550b) storing a plurality of modules according to the disclosed embodiments. Memory 550 may include, for example, a database 701, a database access module 702, an action execution module 703, a trigger identification module 704, and an information deriving module 705. The modules and database shown in FIG. 7A are by example only, and a processing device in the disclosed embodiments may operate according to any suitable process. Further, although the modules and database of FIG. 7A are depicted as being stored in the memory of a wearable apparatus, in some embodiments, one or more of the modules and databases may be stored in a remote location, such as in a computing device (e.g., computing device 120) and/or a server (e.g., server 250).

Database 701 may be configured to store various images, such as images or video streams captured by image sensor 220, 220a, and/or 220b. Database 701 may also be configured to store images that are not captured by image sensor 220, 220a, and/or 220b. For example, previously acquired images and object types e.g., a face, a product, text, a logo, a public sign, etc., may be stored in database 701. Database 701 may also be configured to store information derived from images or video streams captured by image sensor 220, 220a, and/or 220b, such as an image identifier, a wearable apparatus identifier, a descriptor of identified content, a location of where the image was taken, a date when the image was taken, and a time when the image was taken. Database 701 may also be configured to store user profile information, such as a gender, age, weight, height, hair color, eye color, physical attributes, income level, education level, a home address, a work address, marital status, and/or a postal code.

In some embodiments, the processing device may execute instructions associated with database access module 702 to access database 701, for example, to retrieve an image captured by image sensor 220, 220a, and/or 220b for analysis. In some embodiments, the processing device may execute instructions associated with database access module 702 to retrieve a pre-stored object for comparison with an image captured in real time by image sensor 220, 220a, and/or 220b. The processing device may execute instructions associated with database access module 702 to store images and related information in image database 701.

In some embodiments, the processing device may execute instructions associated with action execution module 703 to receive image data from wearable camera systems. The processing device may execute instructions associated with action execution module 703 to perform certain actions associated with an identified trigger, as discussed below. An exemplary action may be to receive a feedback from a server 250. When receiving a feedback from a server 250, the processing device may execute instructions associated with action execution module 703 to provide the feedback to user 100 via feedback-outputting unit 230 included in (or in communication with) the wearable camera systems and/or via feedback unit 545 included in computing device 120.

In some embodiments, the processing device may execute instructions associated with trigger identification module 704 to identify a trigger, e.g., a visual trigger or a hand-related trigger present in image data. Visual triggers may include the identification of any type of object, person, location, and/or context within image data. The term "trigger" includes any information in the image data that may cause a wearable apparatus to execute an action. For example, apparatus 110 may detect as a trigger a finger or hand of user 100 holding a product, a predefined contextual situation in an environment, an appearance of a face of a person, etc.

In some embodiments, the processing device may execute instructions associated with information deriving module 705 to derive information related to captured images or video streams, such as an image identifier, a wearable apparatus identifier, a descriptor of identified content, a location of where an image was taken, a date when an image was taken, and/or a time when an image was taken. An image identifier may be an identifier to uniquely identify an image captured by image sensor 220, 220a, and/or 220b. A wearable apparatus identifier may uniquely identify a wearable apparatus or a wearable camera system. Identified content may include a descriptor of identified content, e.g., a descriptor of identified objects, people, locations, context, etc., determined from a captured image. A location of a captured image may include information indicating that user 100 who wears wearable apparatus 110 is on a street, outside of a particular store, etc. In some embodiments, the location may also include geographical location information, such as a Global Positioning System (GPS) coordinates. Date information may include the date when an image was taken, and time information may include the time when an image was taken.

Figure 7B:
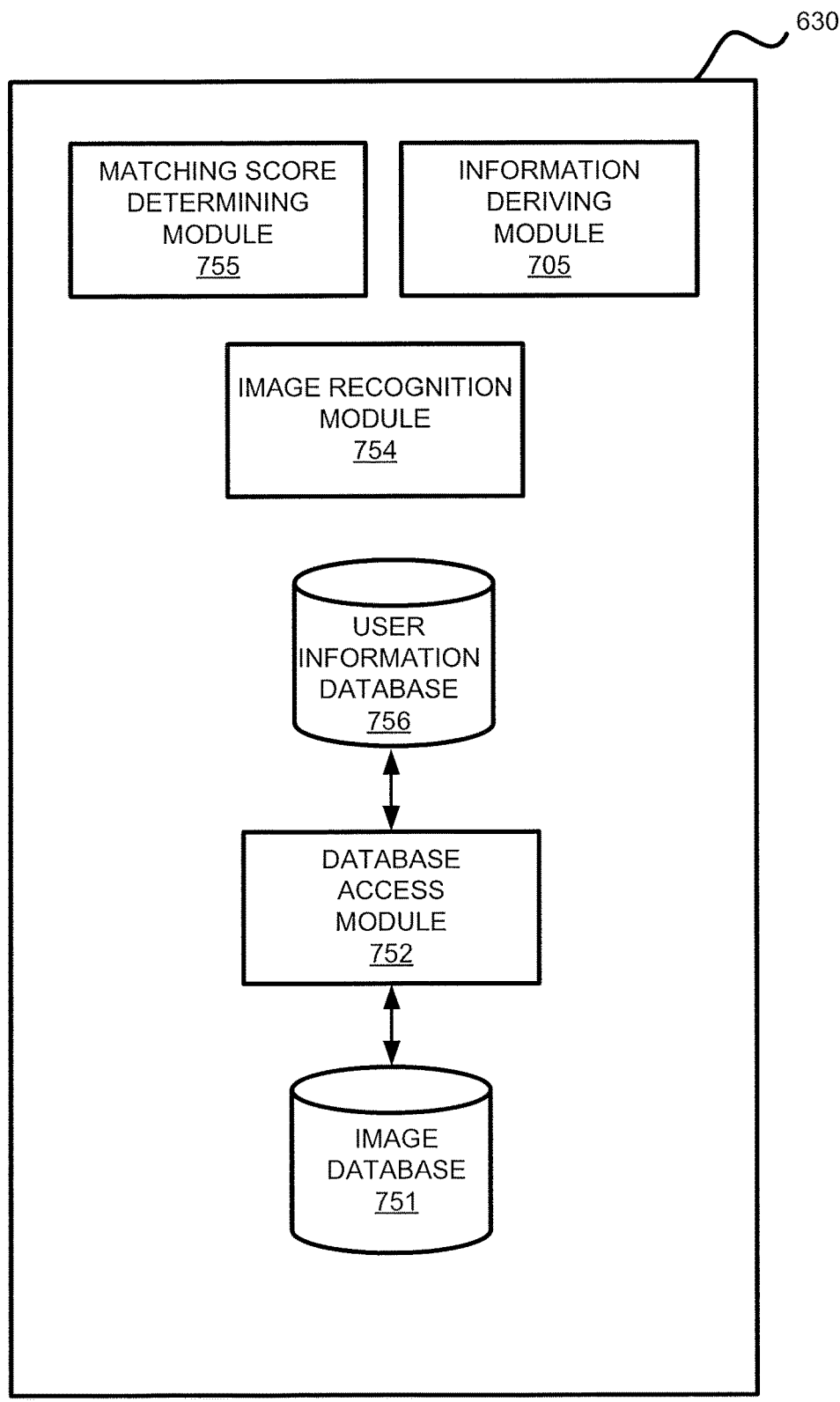
FIG. 7B is a block diagram illustrating an example memory of a server storing a plurality of modules.

FIG. 7B is a block diagram illustrating an example memory 630 of server 250 storing a plurality of modules according to disclosed embodiments. Memory 630 may include an image database 751, an information deriving module 705, a database access module 752, an image recognition module 754, a matching score determining module 755, a user information database 756. The modules and databases shown in FIG. 7B are by example only, and a processor in the disclosed embodiments may operate according to any suitable process. Further, although the modules and databases of FIG. 7B are depicted as being stored in the memory of a server, in some embodiments, one or more of the modules and databases may be stored in a wearable camera system (e.g., apparatus 110) and/or in a computing device (e.g., computing device 120).

As discussed above, the processing device may execute instructions associated with information deriving module 705 to derive information related to captured images and/or video streams, such as an image identifier, a wearable apparatus identifier, identified content, a location of where an image was taken, a date when an image was taken, and/or a time when an image was taken.

Image database 751 may be configured to store image data received from wearable camera systems. Image database 751 may be configured to store various images, received from wearable captured by image sensor 220, 220a, and/or 220b. Image database 751 may also be configured to store images that are not captured by image sensor 220, 220a, and/or 220b. For example, previously acquired images of object types e.g., a face, a product, text, a logo, a public sign, etc., may be stored in image database 751. Image database 751 may also be configured to receive and store information derived from images or video streams captured by image sensor 220, 220*a*, and/or 220*b*, such as an image identifier, a wearable apparatus identifier, identified content, a location of where the image was taken, a date when the image was taken, and/or a time when the image was taken.

In some embodiments, the processing device may execute instructions associated with database access module 752 to access image database 751 and/or user information database 756, for example, to retrieve an image, image information, and/or user information for analysis. In some embodiments, the processing device may execute instructions associated with database access module 752 to retrieve a pre-stored object for comparison with an image captured and received in real time from a wearable camera system. The processing device may execute instructions associated with database access module 752 to store images and other data in image database 751 and user information in user information database 756.

In some embodiments, the processing device may execute instructions associated with image recognition module 754 to analyze image data received from a wearable apparatus 110 for the purpose of identifying, for example, objects, faces, locations, people, context, activities, text, logos, and any other feature of a user's environment. Embodiments of the present disclosure may use various image recognition techniques, including, for example, object identification, facial recognition, and optical character recognition to identify triggers or other content within images. These techniques may be used singularly and in conjunction with one another.

In some embodiments, the processing device may execute instructions associated with image recognition module 754 to initially categorize images by image type. For example, portions of images may be initially categorized as text, faces, objects, scenes, etc. Categorizations may be used by the processing device to select image recognition techniques to be used.

In some embodiments, the processing device may execute instructions associated with image recognition module 754 to identify objects or items in an image or a portion of an image. For example, the processing device may execute instructions associated with image recognition module 754 to compare one or more images and/or image portions stored in a database. Objects may be identified through, for example, a categorization process. For example, an object in an image portion may be categorized based on comparisons with one or more images of representative objects in a database. Based on the comparisons, an object may be assigned a category, e.g., vehicle, tree, building, consumer product, person, etc. The object may then be further categorized based on comparisons with sub-categories within a first assigned category (e.g., subcategories of person may include friend, co-worker, doctor, etc.). Thus, the identity of an object may be narrowed down through multiple image comparisons. Objects may also be identified, for example, through other types of comparisons with images stored in a remote and/or local database.

Scene and/or contextual situation recognition may be performed based on the recognition of multiple objects within an image and their relationship with one another. Object identification may be used to identify multiple objects within a scene via comparison with databases, and relationships between identified objects may be used to identify a scene. For example, the recognition of multiple chairs and a table may indicate a dining scene if the chairs are located around the table and dinnerware is identified in the image. The recognition of multiple chairs and a table may also indicate, for example, a press conference, if the chairs are aligned in rows facing the table.

Facial recognition may also be performed to identify portions of an image. Facial recognition techniques consistent with the present disclosure may be used to compare image content with images of faces stored in a database. As discussed, recognition of a particular individual's face within the database may constitute a trigger.

Optical character recognition (OCR) may also be used to analyze images. The term "optical character recognition" includes any method executable by a processor to retrieve machine-editable text from images of text, pictures, graphics, etc. Some OCR techniques and other document recognition technology use a pattern matching process to compare the parts of an image to sample characters on a pixel-by-pixel basis. This process, however, does not work well when encountering new fonts, and when the image is not sharp. Accordingly, apparatus 110 may use an OCR technique that compares a plurality of sets of image regions that are proximate to each other. Apparatus 110 may recognize characters in the image based on statistics related to the plurality of the sets of image regions. By using the statistics of the plurality of sets of image regions, apparatus 110 can recognize small font characters defined by more than four pixels e.g., six or more pixels. In addition, apparatus 110 may use several images from different perspectives to recognize text on a curved surface. In another embodiment, apparatus 110 can identify in image data an existence of printed information associated with a trigger stored in a database and execute the trigger command thereafter. Examples of a system command include: "enter training mode," "enter airplane mode," "backup content," "update operating system," etc.

Curved surface textual recognition may be particularly useful for identifying text on, for example, a consumer product. A curved surface may include any surface containing at least one bend, arc, round, or any other non-straight structure. For example, the outer surfaces of a bottle, a can, a tin, and a cathode ray tube (CRT) screen are all examples of a curved surface. For simplicity, an object having a curved surface is herein referred to as a curved object. Curved objects may include a food product (e.g., a food product with a can or a tin package), a beverage (e.g., a bottle or a can), a pharmaceutical drug (e.g., a drug with a drug bottle), etc., and text may include text on a label associated with curved object.

In some embodiments, the processing device may perform a layout analysis in addition to optical character recognition. Apparatus 110 may capture an image that includes text. After capturing the image, to save resources and to process portions of the text that are relevant to the user and may include triggers, apparatus 110 may initially perform a layout analysis on the text. The term "layout analysis" refers to any process of identifying regions in an image that includes text. For example, layout analysis may detect paragraphs, blocks, zones, logos, titles, captions, footnotes, etc.

In some embodiments, the processing device may execute instructions associated with matching score determining module 755 to determine a value of the matching score related to two or more users of wearable camera systems 110. The processing device may execute instructions associated with matching score determining module 755 to use a myriad of factors in determining a matching score between two users. For example, the processing device may execute instructions associated with matching score determining module 755 to determine a value of the matching score based on information related to image data, e.g., image identifier, a wearable apparatus identifier, identified content, a location of where an image was taken, a date when an image was taken, and a time when an image was taken. As another example, the processing device may execute instructions associated with matching score determining module 755 to determine a value of the matching score of at least two users based on information related to the two users, e.g., gender, age, weight, height, hair color, eye color, physical attributes, income level, education level, home address, work address, marital status, postal code, and any other relevant user data. In some embodiments, the processing device may execute instructions associated with matching score determining module 755 to determine a value of the matching score based on a combination of one or more items of information related to image data and/or one or more items of information related to at least two users.

The value of the matching score may be based on image data received from wearable camera systems of at least two users and may indicate a level of exposure of the two users to similar visual details in their environments. "Similar visual details" may include any commonality identified in image data captured from at least two wearable camera systems. For example, analysis of image data may reveal that two users enjoy similar food, similar restaurants, similar products, similar recreational activities, similar locations, etc., which may individually or collectively contribute to determining the value of a matching score.

In some embodiments, two users may have multiple matching scores, with each matching score pertaining to a particular category. For example, the processing device may execute instructions associated with matching score determining module 755 to determine that two users have a high matching score related to a restaurant category, but a low matching score in another category, such as recreational activities. Matching scores of different categories may be used separately, or may be combined to create composite matching scores.

Based on a matching score, the processing device may execute instructions associated with matching score determining module 755 to suggest a possible match between two or more users. For example, the processing device may execute instructions associated with matching score determining module 755 to determine that two users have a high matching score, and suggest to the users that they may wish to meet. If the users agree to the possible match, contact information may be shared. In other embodiments, based on a matching score, the processing device may execute instructions associated with matching score determining module 755 to identify a common preference of at least two users. For example, the processing device may execute instructions associated with matching score determining module 755 to identify that two or more users enjoy something in common, and may generate data (e.g., a notification sent to computing device 240) that permits a user to search for and/or locate other users with the same common preference.

In other embodiments, based on a matching score, the processing device may execute instructions associated with matching score determining module 755 to build a social graph of two or more users. A social graph may be a graph of interrelationships between individual users, and may include a series of nodes representing users and links representing commonalties between users. One type of commonality may be that the users know each other personally. Commonalities may also be based on a matching score between users. In some embodiments, the processing device may execute instructions associated with matching score determining module 755 to build a social graph based on a threshold of matching scores between users. For example, users having a matching score that surpasses a threshold value may be linked in the social graph. Links in a social graph may be determined by one or more categorized matching scores, permitting a user to, for example, generate a social graph based on a single category (e.g., culinary preferences), or a combination of categories (e.g., culinary preferences and literary preferences).

In some embodiments, the processing device may execute instructions associated with matching score determining module 755 to determine a recommendation based on the value of the matching score for a user. The recommendation may be based on a single category or multiple categories. The recommendation may be based, for example, on whether or not two users have a high matching score. For example, a recommendation may include a recommendation to try a product, watch a TV program or a motion picture, or try a restaurant, based on a number of users having high matching scores that have recently tried the product, program or movie, or restaurant. By using categorized matching scores, the processing device may execute instructions associated with matching score determining module 755 to make recommendations based on those categories in which users have high matching scores. Thus, while a user has a high overall matching score with a second user, they may have a low matching score in a particular category. In some embodiments, the processing device may execute instructions associated with matching score determining module 755 to recognize this low score, and not provide recommendations in such a category between these users. The reverse may also occur, with users receiving recommendations based on the actions of other users that have low overall matching scores but high scores in a category that a recommendation is based on.

User information database 756 may be configured to store user profile information. User profile information may include gender, age, weight, height, hair color, eye color, physical attributes of a user, income level, education level, a home address, a work address, marital status, and/or a postal code. User profile information may be set by a user 100 via its wearable camera systems or its computing device connected to the wearable camera systems via wired or wireless communications connection. User information database 756 may store user information received from a wearable camera systems or a computing device in communication with the wearable camera system.

FIG. 8 illustrates an exemplary database table 1200 for storing user information associated with at least one of users, 1261, 1262 of wearable camera systems 110. Although illustrated as a table, database 1200 may take any suitable form for the storage of data, including, for example, relational and operational databases. Database 1200 may be configured to store user profile information, such as a gender 1210, age 1211, weight 1212, height 1213, hair color 1214, eye color 1215, other physical attributes, income level, education level, a home address, a work address, marital status, a postal code 1222, and any other additional user information that may be useful for matching score purposes.

Figure 9:
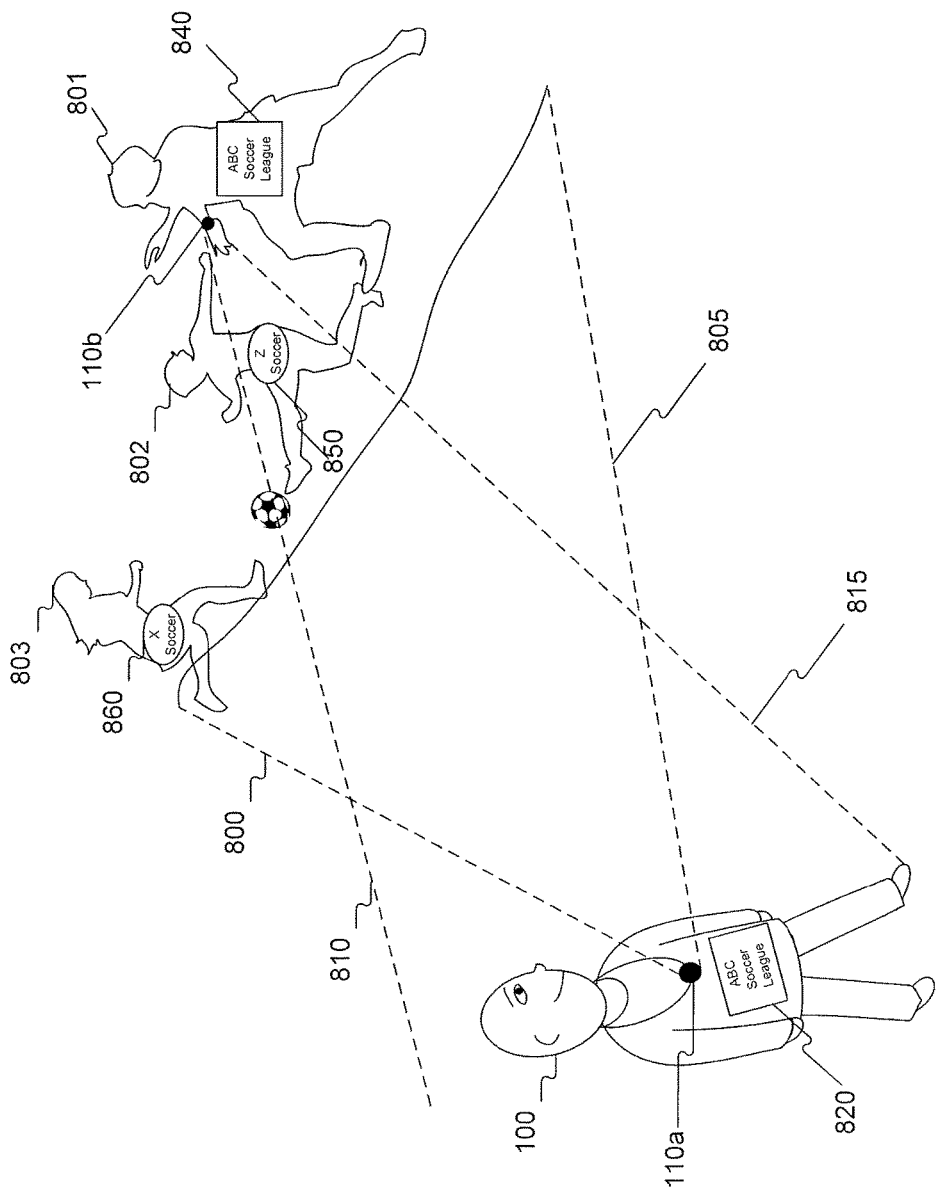
FIG. 9 shows an example environment including a plurality of wearable camera systems for capturing images.

FIG. 9 illustrates an exemplary environment including a plurality of wearable camera systems for capturing images, consistent with disclosed embodiments. As shown in FIG. 9, wearable apparatuses 110a and 110b may be carried on a necklace or a wrist worn by users 100 and 801, respectively. It is understood that wearable apparatus 110a or 110b may be worn by user 100 or 801 on any suitable part of user 100 or 801. Wearable apparatus 110*a* and 110*b* may each include image sensors 220, 220*a*, and/or 220*b* (as shown in FIGS. 5A and 5B). The field of view of the image sensor of wearable apparatus 110*a* is indicated by dashed lines 800 and 805. The field of view of the image sensor of wearable apparatus 110*b* is indicated by dashed lines 810 and 815.

The image sensors of the wearable apparatuses 110*a* and 110*b* may capture one or more images of the scene or environment in front of users 100 and 801. In this example, user 100 may be walking or standing on an edge of a soccer field looking at a soccer game. One or more images captured by wearable apparatus 110*a* may include a first image including a soccer player 801 wearing a shirt with text 840 "ABC Soccer League," indicating that user 801 plays for "ABC Soccer League." The images may include a second image including a soccer player 802 kicking a soccer ball and wearing a shirt having text 850 "Z Soccer," indicating that player 802 plays for "Z Soccer." team. The images may include a third image including a soccer player 803 wearing a shirt having text 860 "X Soccer," indicating player 803 plays for "X Soccer" team. One or more images captured by wearable apparatus 110*b* may include one or more images including user 100 wearing a shirt with text 820 "ABC Soccer League" on it, and one or more images depicting the soccer game.

FIG. 10 illustrates an exemplary database table for storing information associated with captured images. Although illustrated as a table, database 1100 may take any suitable form for the storage of data, including, for example, relational and operational databases. Database 1100 may also be configured to store information derived from images or video streams captured by image sensor 220, 220*a*, and/or 220*b*, such as an image identifier 1110, a wearable apparatus identifier or wearable camera systems identifier 1111, identified content 1112, location 1113, date 1114, time 1115, and user 1105. An image identifier 1110 may be an identifier to uniquely identify an image or video data captured by image sensor 220, 220*a*, and/or 220*b*. A wearable apparatus identifier or wearable camera systems identifier 1111 may be an identifier to uniquely identify a specific wearable apparatus or wearable camera systems 110. Identified content 1112 may include information or a descriptor of content from a captured image, derived via image recognition techniques. Location 1113 of a captured image may include information indicating that user 100 who wears wearable apparatus 110 is on a street, outside of a particular store, and/or in a certain type of location, such as a park. In some embodiments, the location may also include geographical location information, such as a Global Positioning System (GPS) coordinates. Date information 1114 may include the date when an image was taken, and time information 1115 may include the time when an image was taken. Database 1100 may also store an association between information in the database and at least one user 100. Information associated with at least one of captured images may be used when determining a value of a matching score.

Data may be stored in association with information identifying a specific user, and/or may be stored in an aggregated database of many users. For example, storing data in an aggregate database may permit match score determining module 755 to draw relationships and inferences between users. For example, match score determining module 755 may identify all users associated with images captured at a certain time in a certain location, or all users associated with images of a certain product, etc.

Figure 11:
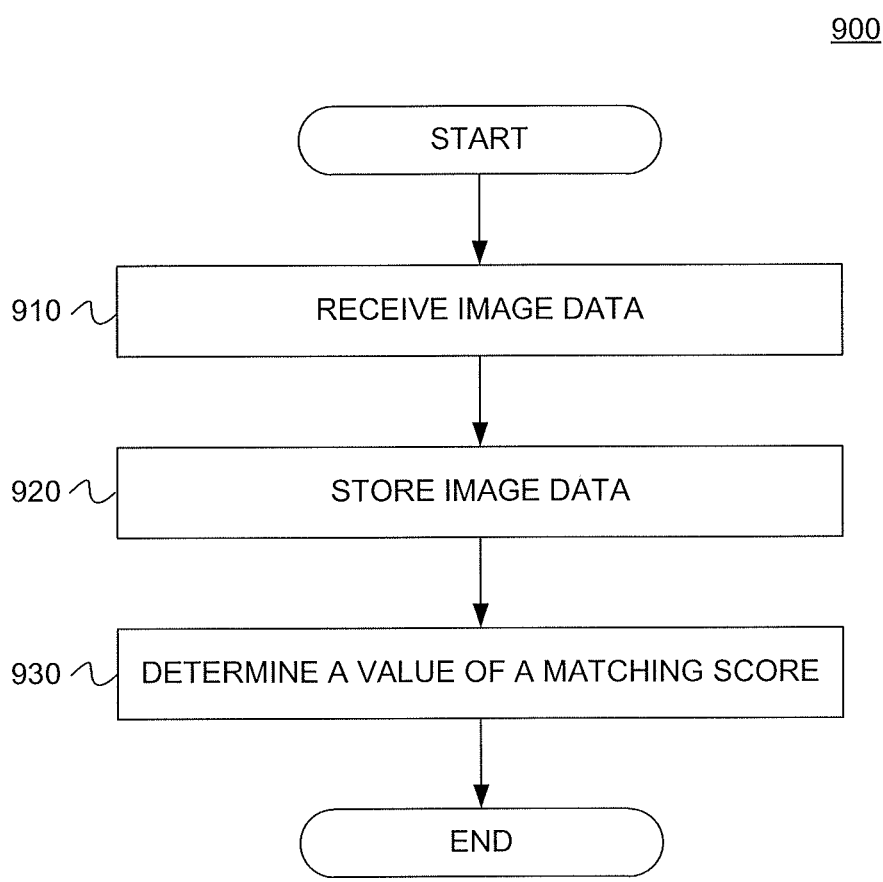
FIG. 11 is a flowchart of an exemplary process for determining a matching score related to users of wearable camera systems.

Although illustrated as separate database tables, information in database tables 1100 and 1200 may be combined in any way suitable. For example, a relational database may include all of the information discussed above with respect to database tables 1100 and 1200 and the relationships between the various data. Match score determining module 755 may use data in database tables 1100 and 1200, and relationships between the data to determine a matching score between two users. FIG. 11 is a flowchart of an exemplary process 900 for determining, by server 250, a matching score related to users of wearable camera systems. In some embodiments, one or more steps of process 900 may be performed by a processing device including a wearable apparatus and/or other device (e.g., computing device 120). The flowchart of FIG. 11 is discussed below with respect to the example scene illustrated in FIG. 9.

When wearable camera systems 110 (including 110*a*, 110*b*) capture images from an environment of a corresponding user, and send image data to server 250, server 250 may be configured to receive the image data via network interface 640 at step 910. At least one processing device 610 associated with the server 250 may be programmed to receive image data from a plurality of wearable camera systems 110 (e.g., 110*a*, 110*b*) at step 910. At step 920, processing device 610 may also store, in image database 751 of memory 630, image data received from wearable camera systems 110.

At step 930, processor 610 associated with server 250 may further determine a value of a matching score related to at least two users of wearable camera systems 110. The value of the matching score may be based on the image data captured by the plurality of the wearable camera systems (e.g., 110*a*, 110*b*). The value of the matching score may indicate a level of exposure of at least two users to similar visual details in their environments. Matching score information may be used in a variety of purposes. For example, a value of a matching score between two or more users may be determined. That is, two users may have a matching score determined between them. In some embodiments, server 250 may compute matching scores between all users of the system. In alternative embodiments, server 250 may compute matching scores between users that meet certain designated criteria. User profile information such as age, gender, location, may be used as criteria to select users prior to computing a matching score. For example, users 100 and 801 may be identified as persons who both enjoy soccer, based on the scene shown in FIG. 9, and this identification may contribute to a higher matching score.

In some embodiments, a matching score may be determined based on a plurality of image matching scenarios. Thus, for example, if users 100 and 801 are different in other aspects, e.g., age, or other activities, than the high matching score for soccer may not generate a high total matching score. On the other hand, if users 100 and 801 enjoy the same food, frequent the same stores, and enjoy soccer, as indicated by comparisons between image data, a higher matching score may be generated.

In some embodiments, there may be a temporal or locational aspect to a matching score. For example, user 100 and user 801 may have a high matching score based on viewing a soccer game in the same location at the same time, creating a high score that may diminish over time as the user 100 and user 801 move away from the soccer game either temporally or locationally.

The matching score may be used to suggest a possible match between at least two users. For example, two users having a high matching score may be notified of such and the system may suggest a possible match between the at least two users. If the users agree, user information, including, for example, contact information, of the matching users may be shared between the users. In the situation in FIG. 9, for example, wearable apparatuses 110a and 110b may notify their respective users, 100 and 801, of the presence of another user with a high matching score, and suggest a possible match. In some embodiments, notifications may be sent to a device (e.g., computing device 120 or server 250) in communication with a wearable apparatus.

The matching score may be used to identify a common preference of at least two users. This may permit a user, for example, to identify users with a common preference and/or a high matching score. For example, processing device 610 may general a notification, email, or other message suggesting a possible match between users, which may lead to the sharing of contact information as described above.

Figure 12:
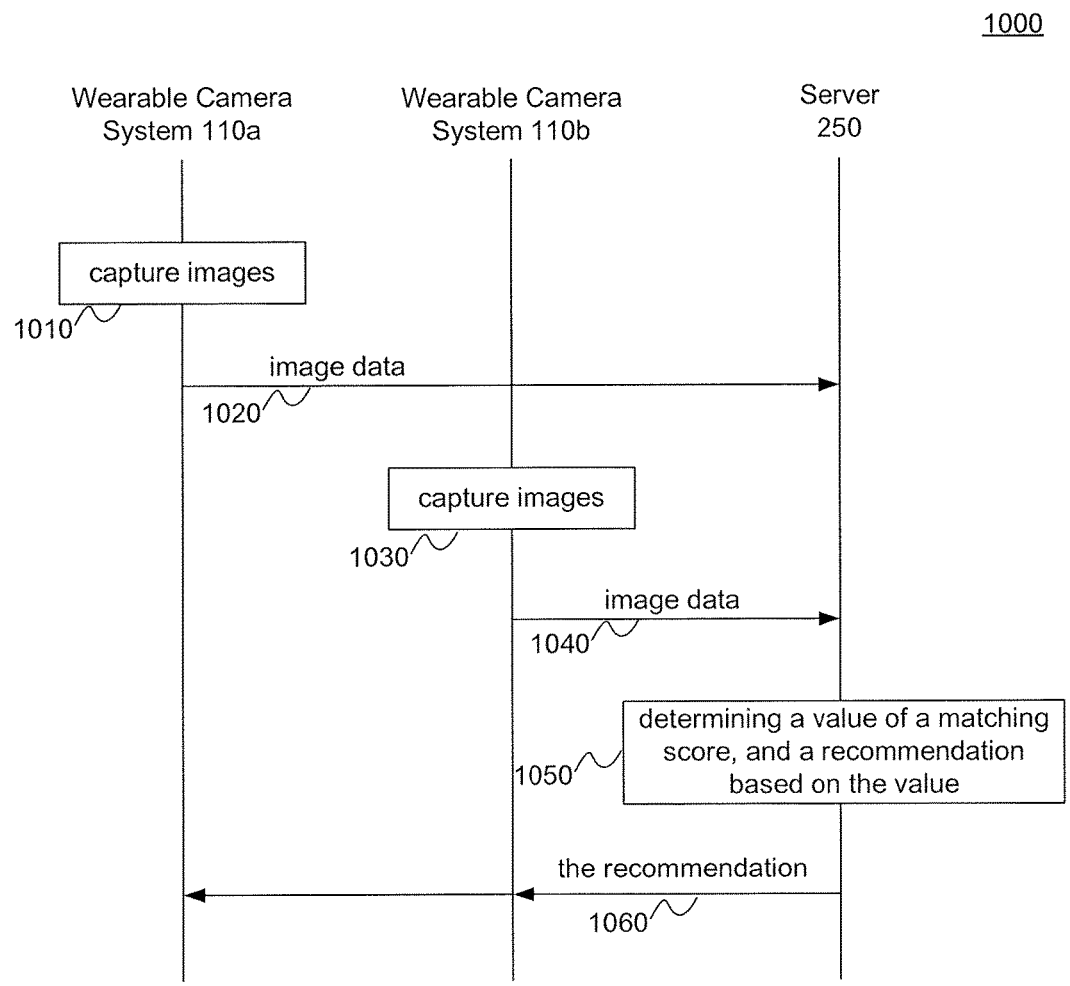
FIG. 12 is a diagram illustrating data communications for determining a matching score related to users of wearable camera systems.

FIG. 12 is schematic diagram 1000 illustrating data communications for determining a matching score related to users of wearable camera systems. Steps shown in diagram 1000 may be performed by various devices included in wearable apparatuses 110a and 110b, computing device 120, and/or server 250. Further, the steps may be performed in combination with or in place of steps included in method 900.

As shown, at steps 1010 and 1030, wearable camera systems 110a and 110b may capture images and producing image data from the captured images. For example, a plurality of wearable camera systems 110 (e.g., 110a and 110b) may be configured to capture images via image sensors 220, 220a, and/or 220b. Image data may include images or video streams captured by the wearable camera systems. Image data may include information derived from images or video streams captured by the plurality of the wearable camera systems 110, for example, location information where the captured images were captured, time when the captured images were captured, and identified content in the captured images. The wearable camera systems may capture the images at different times and/or different locations, at similar times and/or locations, or at substantially the same times and/or locations.

Wearable camera system 110a and 110b may send captured image data to server 250 (and/or computing device 120) at steps 1020 and 1040. Server 250 (and/or computing device 120) may be configured to receive the image data. The image data may include images captured by image sensor 220, 220a, and/or 220b and/or information related to the images such as a location where the images were captured, a date when the images were captured, a time when the images were captured, and identified content in the captured images. Server 250 (and/or computing device 120) may be configured to receive image data from a plurality of wearable camera systems 110 (e.g., 110a and 110b). After receiving the image data, server 250 (and/or computing device 120) may be configured to store the image data.

At step 1050, server 250 (and/or computing device 250) may determine a value of a matching score related to at least two users of the wearable camera systems 110 (e.g., 110a and 110b), and determining, based on the value of the matching score, a recommendation for at least one user. For example, server 250 and/or computing device 120 may determine a value of a matching score related to at least two users of the wearable camera systems. When determining a value of a matching score between the at least two users, server 250 and/or computing device 120 may use information stored in, for example, memory 550, 550a, 550b, and/or 630.

Information used to determine a value of a matching score may be related to the image data such as location information where the captured images were captured, time information when the captured images were captured, and identified content in the captured images. Information may be related to the at least two users such as gender, age, weight, height, hair color, eye color, physical attributes, income level, education level, a home address, a work address, marital status, and/or a postal code. Based on the value of the matching score, server 250 and/or computing device 120 may further determine a recommendation for at least one of the users at step 1050. For example, server 250 and/or computing device 120 may recommend transmitting a message, at step 1060, to notify one or more of the users that they share something in common (e.g., ABC Soccer League). As another example, server 250 and/or computing device 120 may recommend a product (e.g. a soccer ball) based on the captured images and the presence of one or more users at a soccer game.

Server 250 (and/or computing device 120) may provide the determined recommendation to at least one of the users at step 1060. For example, server 250 and/or computing device 120 may provide the recommendation by transmitting a message (e.g., indicating that another person has ABC Soccer League in common) to at least one of the users at step 1060. In some embodiments, server 250 and/or computing device 120 may recommend a product (e.g. a soccer ball) and may transmit a recommendation and/or coupon for the product to at least of the users. Recommendations may include recommendations to meet, recommendations to watch a certain television program or motion picture, recommendations to go to a certain store or restaurant, recommendations to visit a certain park, and any other suitable recommendation that may be determined based on a matching score. Server 250 may transmit messages, recommendations, and/or coupons to a device associated with a user, such as a wearable device and/or computing device 120 and/or to an account of a user (e.g., an email account, social networking account, etc.).

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A server for determining a matching score between users of wearable camera systems, the server comprising:
   a memory for storing image data received from the wearable camera systems, wherein each wearable camera system is configured to capture images from an environment of a corresponding user and produce image data from the captured images; and
   at least one processing device associated with the server and programmed to:
      receive the image data from the wearable camera systems, wherein the image data includes first image data from a first wearable camera system of a first user and second image data from a second wearable camera system of a second user; and
      determine a value of the matching score between the first user and the second user of the wearable camera systems based on:
         the first image data received from the wearable camera system of the first user and the second image data received from the wearable camera system of the second user, and
         information related to the first user and the second user, including profile information for each of the first user and the second user, wherein the matching score between the first user and the second user indicates a level of commonality between the first user and the second user according to one or more visual details of objects, people, or features in an environment of the first user and one or more visual details of objects, people, or features in an environment of the second user.

2. The server of claim 1, wherein the image data includes images or video streams captured by the wearable camera systems.

3. The server of claim 1, wherein the image data includes information derived from at least one of images and video streams captured by the wearable camera systems.

4. The server of claim 1, wherein the at least one processing device is further programmed to:
   determine, based on the value of the matching score, a recommendation for at least one of the first and second users; and
   provide the recommendation to the at least one of the first and second users.

5. The server of claim 4, wherein the recommendation includes a product that was used by at least one of the first and second users in at least one of the captured images.

6. The server of claim 1, wherein the at least one processing device is further programmed to use information related to the image data to determine the value of the matching score of the first and second users.

7. The server of claim 6, wherein the information related to the image data includes a location where the captured images were captured, a time when the captured images were captured, and identified content in the captured images.

8. The server of claim 1, wherein the profile information related to the first and second users includes at least one of gender, age, weight, height, hair color, eye color, physical attributes of at least one of the first and second users, income level, education level, a home address, a work address, marital status, and a postal code.

9. The server of claim 1, wherein the matching score is used to suggest a possible match between the first and second users.

10. The server of claim 1, wherein the matching score is used to identify a common preference of the first and second users.

11. The server of claim 1, wherein the matching score is used to build a social graph of the first and second users.

12. A computer-implemented method for determining a matching score between users of wearable camera systems, the method comprising:
   receiving, by at least one processing device, image data received from the wearable camera systems, wherein each wearable camera system is configured to capture images from an environment of a corresponding user and produce image data from the captured images, wherein the image data includes first image data from a first wearable camera system of a first user and second image data from a second wearable camera system of a second user; and
   determining, by the at least one processing device, a value of the matching score between the first user and the second user of the wearable camera systems based on:
      the first image data received from the wearable camera system of the first user and the second image data received from the wearable camera system of the second user, and
      information related to the first user and the second user, including profile information for each of the first user and the second user, wherein the matching score between the first user and the second user indicates a level of commonality between the first user and the second user according to one or more visual details of objects, people, or features in an environment of the first user and one or more visual details of objects, people, or features in an environment of the second user.

13. The computer-implemented method of claim 12 further comprising:
   determining, based on the value of the matching score, a recommendation for at least one of the first and second users.

14. The computer-implemented method of claim 12, wherein the matching score is used to suggest a possible match between the first and second users.

15. The computer-implemented method of claim 12, wherein the matching score is used to identify a common trait of the first and second users.

16. The computer-implemented method of claim 12, wherein the matching score is used to build a social graph of the first and second users.

17. A non-transitory computer readable storing computer implementable instructions for carrying out the method of claim 12.

* * * * *